United States Patent
Suzuki et al.

(10) Patent No.: US 7,587,430 B2
(45) Date of Patent: Sep. 8, 2009

(54) BACKUP SYSTEM FOR DATA BASE

(75) Inventors: Yoshio Suzuki, Kokubunji (JP); Nobuo Kawamura, Atsugi (JP); Satoru Watanabe, Kokubunji (JP); Shinji Fujiwara, Sagamihara (JP); Kazuhiko Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 219 days.

(21) Appl. No.: 11/405,464

(22) Filed: Apr. 18, 2006

(65) Prior Publication Data

US 2007/0203958 A1 Aug. 30, 2007

(30) Foreign Application Priority Data

Feb. 28, 2006 (JP) .............................. 2006-052174

(51) Int. Cl.
*G06F 17/30* (2006.01)
(52) U.S. Cl. ...................... 707/202; 707/10; 707/201; 707/204
(58) Field of Classification Search .............. 707/10, 707/202, 204
See application file for complete search history.

(56) References Cited

U.S. PATENT DOCUMENTS

| | | | | |
|---|---|---|---|---|
| 6,014,674 A | * | 1/2000 | McCargar | ................ 707/202 |
| 6,567,928 B1 | * | 5/2003 | Lyle et al. | ................ 707/202 |
| 6,651,073 B1 | * | 11/2003 | Lyle et al. | ................ 707/202 |
| 7,337,195 B2 | * | 2/2008 | Hrle et al. | ................ 707/202 |
| 2004/0098425 A1 | * | 5/2004 | Wiss et al. | ................ 707/204 |
| 2004/0243535 A1 | * | 12/2004 | Bailey | ......................... 707/1 |

FOREIGN PATENT DOCUMENTS

| | | |
|---|---|---|
| JP | 2004-078476 | 3/2004 |
| JP | 2005-250921 | 9/2005 |
| JP | 2006-4147 | 1/2006 |
| JP | 2006-48103 | 2/2006 |

OTHER PUBLICATIONS

"Evaluation of Remote Backup Algorithms for Transactions-Processing System", by C. Polyzois, et al. ACM Transactions on Database Systems. vol. 19, No. 3, Sep. 1994, pp. 423-449.

* cited by examiner

*Primary Examiner*—Charles Rones
*Assistant Examiner*—Rezwanul Mahmood
(74) *Attorney, Agent, or Firm*—Brundidge & Stanger, P.C.

(57) ABSTRACT

Database synchronization processing is completed within a reasonable time, using narrow-band network that connects a primary site to a secondary site, to reduce the running cost of a system. A primary DBMS has a transaction executing unit for reading a primary DB of a primary storage system to update data as requested in an update request, and a write unit for writing the updated data in the primary storage system. The primary storage system includes an unnecessary information removing unit for overwriting an unused area in the written data successively with one of a preset character and a preset value. The primary storage system is connected, via a network, to a second storage system which stores a copy of the primary DB. The primary storage system is connected to the network via a network device which has a data compression unit for compressing a succession of the same value.

6 Claims, 23 Drawing Sheets

1

BACKUP SYSTEM FOR DATA BASE

CLAIM OF PRIORITY

The present application claims priority from Japanese application P2006-52174 filed on Feb. 28, 2006, the content of which is hereby incorporated by reference into this application.

BACKGROUND

This invention relates to an improvement of a data backup system, in particular, a backup system suitable for a database.

In recent years, database backup systems of the type that uses two computer systems have come to be employed widely. Backing up a database is to make a copy of data in one of two computer systems and store the copy in the other computer system. The computer system of which data is backed up is called an active system (or a primary site) and the computer system to which the data is backed up is called a standby system (or a secondary site). The data stored in the standby system is called backup data. Transaction log transfer is known as a database backup method that uses a double system (see, for example, Christos A. Polyzois, Hector Garcia-Molina, Evaluation of remote backup algorithms for transaction-processing systems, ACM Transactions on Database Systems (TODS), vol. 19, No. 3, p. 423 to 449, September 1994).

Transaction log transfer is a method of transferring a data update record (a log) of the active system to the standby system to create backup data in the standby system. Such the transaction log transfer makes sure that backup data in the standby system is the same as data in the active system at the start of backup operation. After the backup operation is started, the data update record is transferred to the standby system. In the standby system, backup data is updated based on the transferred data update record, and thus creates the latest backup data.

A computer system in general contains a storage system in which data of the computer system is stored. Some known storage systems have a function of copying data between two storage systems (remote copy) (see JP 2004-78746 A). The remote copy function is to copy data of one storage system to the other storage system by transferring the data via a network.

Recent storage systems increasingly employ disaster recovery systems that use remote copy. A disaster recovery system (hereinafter referred to as "DR system") remote-copies data from a site that is in operation (primary site) to a remote site (secondary site) for the purpose of enabling the business to continue after a failure caused by a natural disaster or the like.

The DR system in some cases places the secondary site several hundreds km or more away from the primary site. In such the cases, the construction and maintenance of a network that connects the secondary site to the primary site cost more. The maintenance cost is particularly high when a wide-band network (of, e.g., a few Gbps) is employed as a several hundred-km long network that connects the two sites. To cut the cost of the DR system, the network between the two sites has to be built from a narrow-band network (of, e.g., 100 Mbps). A known DR system that accommodates this condition is a log-based DR system which copies a database of the primary site by transferring only logs from the database of the primary site to the secondary site and carrying out log application in the secondary site. In the log-based DR system, a computer of the secondary site reads a log transferred through remote copy and a log application control unit applies the read log to a database of the secondary site. With communications between the primary site and the secondary site limited to transfer of logs, the log-based DR system can employ a narrow-band network for the network that connects the two sites.

SUMMARY

The DR system employing transaction log transfer can make do with a narrow-band network since only logs are transferred from the primary site to the secondary site in normal operation after initial setup. In the actual running of a database, however, it is sometimes necessary to transfer the database of the primary site to the secondary site. For instance, batch processing, which is executed late at night, on holidays, or the like, may include log-less batch processing in which a large amount of update is made to the database of the primary site while log output is temporarily suspended in order to avoid affecting the processing performance of the computer. This necessitates transfer of the database from the primary site to make the database in the secondary site consistent with the database in the primary site after the batch processing is completed. To give another example, if the DR system is shut down temporarily due to a failure (line failure or the like) in the primary site but the database is kept running, the database in the primary site upon recovery from the failure does not coincide with the database in the secondary site. This necessitates transfer of the database from the primary site to the secondary site to make the database in the secondary site consistent with the database in the primary site.

As described above, even a computer system having a DR system has a possibility of daily encountering cases where transaction log transfer cannot be used. Synchronization processing for making the database in the secondary site consistent with the database in the primary site is therefore necessary.

One of the methods of synchronizing the databases in the primary site and the secondary site is to use a mirror establishing function of the storage system. With the mirror establishing function, a database is transferred from the primary site to the secondary site by sequentially copying the entire volumes of the storage system that stores the database. This involves transfer of a large amount of data, more than can be transferred within a realistic time period over a narrow-band network that serves as the network between the two sites. If the network connecting the two sites is a wide-band network, the transfer can be completed in a reasonable length of time, which however raises the network cost and thus causes the log-based DR system to lose its merit.

An example of methods of carrying out synchronization processing without using a wide-band network for a network that connects the two sites is tape shipping. In tape shipping, data of the database in the primary site is backed up to a tape medium and the tape is shipped on a truck or the like to the secondary site, where data is restored from the shipped tape and then log application is resumed. However, this method needs to arrange a truck and a maintenance person, and requires backup/restoration processing, which means that not only there are additional costs for shipping and personnel but also the processing is complicated.

This invention has been made in view of the above problems, and it is therefore an object of this invention to provide a system that completes database synchronization processing within a realistic period of time and costs less to run while employing a narrow-band network as a network that interconnects a primary site and a secondary site.

The present invention provides a database management system including: a storage system for storing a database; and a server computer for executing a database management server, which receives one of a reference request and an update request directed to the database of the storage system, and performs one of reference to and updating of the database. In the database management system, the database management server includes: an update executing unit for reading the database of the storage system to update data as requested in the update request; an unnecessary information removing unit for overwriting an unused area in the updated data successively with one of a preset character and a preset value; and a write unit for writing the data in the storage system.

The storage system is connected via a network to a second storage system, which stores a copy of the database. The storage system has a remote copy unit for transferring the database to the second storage system. The storage system is connected to the network via a network device that has a data compression unit for compressing a succession of the same value.

According to this invention, when the database of the storage system is transferred via the network device and the network to another computer or another storage system, the network device compresses a succession of one of a preset character and a preset value, with which an unused area of database update data is overwritten. This shortens the time required to transfer the database. Database transfer from the primary site to the secondary site (synchronization processing, for example) can thus be completed in a reasonable length of time while employing a narrow-band network as the network between the primary site and the secondary site. This invention keeps running cost of the system low by making it possible to use a narrow-band network.

DETAILED DESCRIPTION OF THE PREFERRED EMBODIMENTS

Embodiments of this invention will be described below with reference to the accompanying drawings.

Figure 1:
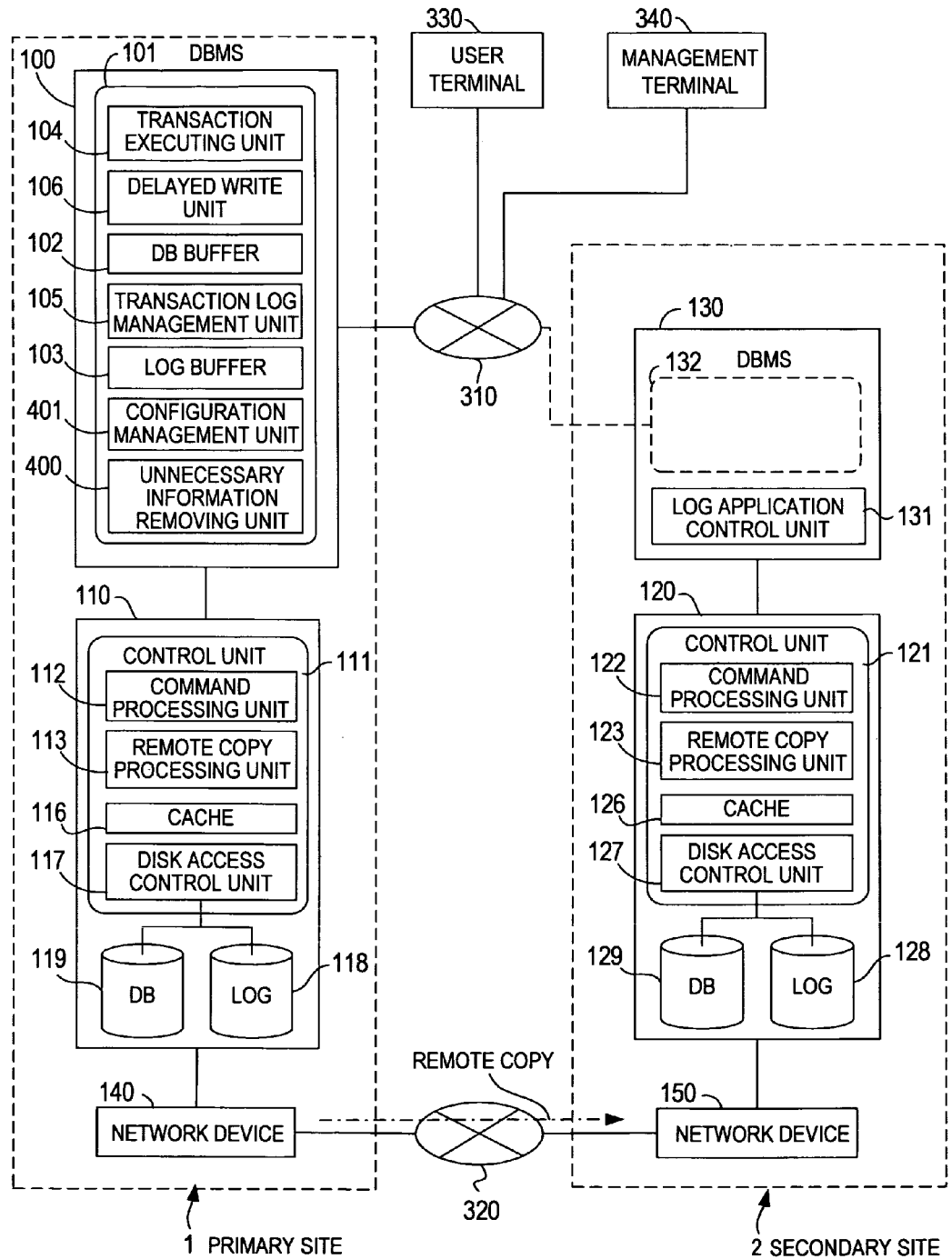
FIG. 1 is a block diagram showing the configuration of a computer system that performs disaster recovery between two sites according to a first embodiment of this invention.

FIG. 1 is a block diagram showing a configuration of a disaster recovery system (hereinafter referred to as DR system) that uses transaction log transfer according to a first embodiment of this invention. FIG. 1 shows an example of backing up a database of a primary site 1 to a secondary site 2.

The backup system shown in FIG. 1 performs disaster recovery by sending a differential transaction log which reflects an update made to a primary database (hereinafter referred to as primary DB) 11 of the primary site (active system) 1 to the secondary site (standby system) 2 and by creating backup data (a DB 129) of the primary DB in the secondary site 2.

The primary site (active system) 1 is composed of a primary server 100 and a primary storage system 110 (primary external storage). Running in the primary server 100 is a primary DBMS (DataBase Management System) 101 (first DBMS) which receives a transaction from a user terminal 330 or the like and provides a primary DB 119 (first database). The primary server 100 functions as a database management system (a database management server).

The primary server 100 (first server) is connected to a network 310 to communicate with the user terminal 330, a secondary server 130 (second server, backup computer) of the secondary site 2, and a management terminal 340. The management terminal 340 can be placed in the primary site 1.

The primary DBMS 101 manages the primary DB 119 stored in the primary storage system 110, which is connected to the primary server 100, and provides a transaction service to the user terminal 330 or the like. The primary DBMS 101 also creates a log when the primary DB 119 is updated, and stores the log in a log 118 of the primary storage system 110. The primary storage system 110 transfers, when running normally, the log 118 to the secondary site 2 in order to backup the primary DB 119.

The primary DBMS 101 has a transaction executing unit 104, which accesses the primary DB 119 upon request from the user terminal 330, a transaction log management unit 105, which creates a log from a differential data and stores the log in the primary storage system 110, a DB buffer 102, which keeps the primary DB 119 of the primary storage system 110 in a memory, a log buffer 103, which keeps a created log in a memory, and a delayed write unit 106, which writes, in the primary DB 119 of the primary storage system 110, update data that has been stored in the DB buffer 102.

The primary DBMS 101 also has an unnecessary information removing unit 400, which speeds up synchronization processing between the primary site 1 and the secondary site 2 by performing pre-processing for data compression while taking into account the significance of information in the primary DB 119, and a configuration management unit 401, which controls the unnecessary information removing unit 400 in accordance with the operation state of the primary DBMS 101.

The primary storage system 110 is composed of a disk subsystem or a disk array to store the primary DB 119 and the log 118. The primary storage system 110 also has a control unit 111, which controls read/write of data in the primary DB 119 and the log 118 as requested by the primary server 100. The control unit 111 is connected to the primary server 100 in the primary site 1 via a SAN (Storage Area Network) or other networks for storage systems. The control unit 111 is also connected to a network device 140 having a data compressing function. The network device 140 is communicable with a secondary storage system 120 (secondary external storage) of the secondary site 2 via a network 320, which is a WAN or the like composed of a narrow-band network (e.g., an IP network of 100 Mbps).

The control unit 111 of the primary storage system 110 has a command processing unit 112, which, upon requests from the primary DBMS 101, issues requests including a request to access the primary DB 119 or to the log 118 and directs log transfer control, a remote copy processing unit 113, which, when the log 118 is updated, sends the updated log 118 (through remote copy) to the secondary storage system 120 of the secondary site 2, a disk cache 116, which temporarily stores data of a disk subsystem in a memory, and a disk access control unit 117, which executes access to the primary DB 119 or to the log 118 as requested by the command processing unit 112 or the remote copy processing unit 113.

In sending the log 118 to the secondary storage system 120 of the secondary site 2, asynchronous remote copy can be employed in addition to synchronous remote copy. The connection between the primary storage system 110 and the primary server 100 is provided by a SAN or other networks, an I/O interface, or the like.

Figure 2:
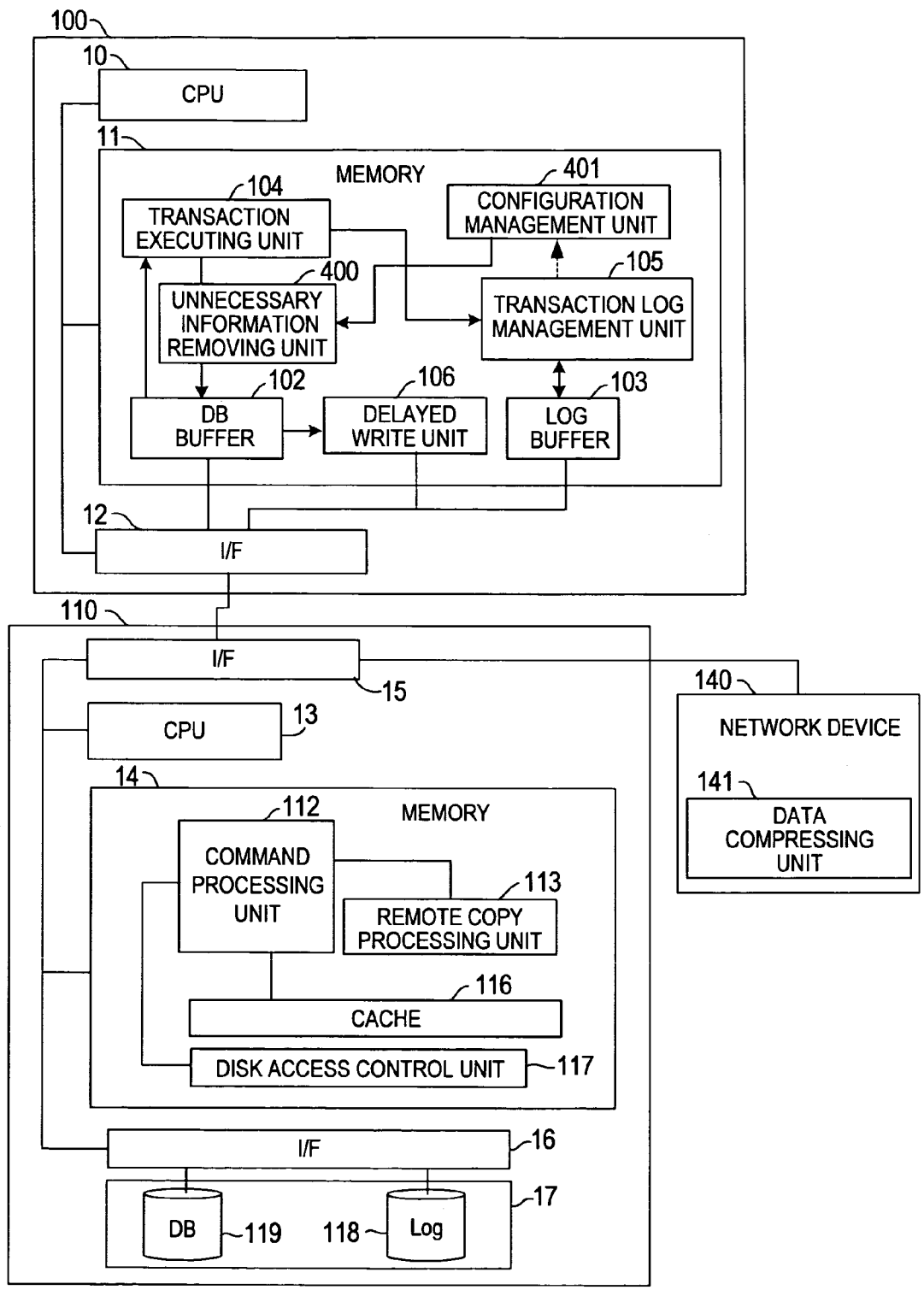
FIG. 2 is a block diagram showing the configurations of a primary site server and a primary storage system according to the first embodiment.

FIG. 2 shows the configurations of the primary server 100 and the primary storage system 110 in the primary site 1. The primary server 100 shown in FIG. 2 has a memory 11, which stores functional components (programs and the like) of the primary DBMS 101 and data, a CPU 10, which executes the functional components stored in the memory 11, and an interface 12, which connects the primary storage system 110 to a network 310. The interface 12 can be an independent interface in the case where the connection with the primary storage system 110 is provided by FC (Fibre Channel) or other types of SAN and the connection with the network 310 employs an IP protocol.

The primary storage system 110 shown in FIG. 2 has a memory 14, which stores functional components (programs and the like) of the control unit 111 and data, a CPU 13, which executes the functional components stored in the memory 14, an interface 15, which connects with the primary server 100, and an interface 16, which connects with the disk subsystem 17. The interface 15 is also connected to the network device 140.

The network device 140 is composed of, for example, a router having an FC-IP conversion function in the case where the connection between the primary storage system 110 and the primary server 100 is provided by an FC (Fibre Channel) or other types of SAN and the connection with the network 320 employs an IP protocol. The network device 140 contains a data compressing unit 141, which compresses data to be sent from the primary storage system 110 to the secondary site 2. The data compressing unit 141 uses a known method such as Stacker compression, which compresses data by replacing a continuous stream of characters with codes (symbols). The data compressing unit 141 can improve the compression ratio when the same character string (data) appears successively. The data compressing unit 141 also has a function of expanding compressed data it receives to the original data size.

The secondary site 2 shown in FIG. 1 is composed of the secondary server 130, where a log application control unit 131 is run to create and update the secondary DB 129 in accordance with the log 118 sent from the primary site 1, and the secondary storage system 120, which stores a log sent from the primary storage system 110 of the primary site 1 and the secondary DB 129 (second database) as a copy of the primary DB 119. The secondary server 130 is equipped with a secondary DBMS 132 (second DBMS) as a failover system to take over DB processing of the primary site 1. The log application control unit 131 and the secondary DBMS 132, which are run in the same server 130 shown in FIG. 1, may be run in separate servers. The log application control unit 131 handles light-load processing and therefore may be run in an appliance server or the like to shut down the secondary server 130.

The secondary storage system 120 is composed of a disk subsystem or a disk array to store the secondary DB 129 and a log 128. The secondary storage system 120 also has a control unit 121, which controls read/write of data in the secondary DB 129 and the log 128 as requested by the secondary server 130.

The control unit 121 of the secondary storage system 120 has a command processing unit 122, which, upon requests from the log application control unit 131 and a network device 150, issues requests including a request to access the secondary DB 129 or to the log 128 and directs log transfer control, a disk cache 126, which temporarily stores data of a disk subsystem in a memory, and a disk access control unit 127, which executes access to the secondary DB 129 or to the log 128 as requested by the command processing unit 122. The control unit 121 of the secondary storage system 120 has a remote copy processing unit 123, which, when the log 128 is updated after the secondary site 2 as a failover site stands in for the primary site 1, sends the updated log 128 (through remote copy) to the primary storage system 110.

The command processing unit 122 receives a synchronization request from the primary storage system 110, and writes the primary DB 119 received from the primary site 1 in the secondary DB 129 of the secondary site 2, to thereby synchronizes the primary and secondary DBs with each other.

The secondary storage system 120 is connected to the network 320 via the network device 150, which has a data compressing function and a data expanding function, as the network device 140 of the primary site 1 does. The network device 150 expands (decodes) compressed data it receives from the primary storage system 110 of the primary site 1 to the original data size, and transfers the expanded data to the secondary storage system 120.

The secondary server 130, secondary storage system 120, and network device 150 of the secondary site 2 are respectively equivalent to the primary server 100, primary storage system 110, and network device 140 of the primary site 1 shown in FIG. 2. The secondary server 130 of the secondary site 2 has a CPU, a memory, an interface, and a disk subsystem as the primary server 100 of the primary site 1 does.

The primary DBMS 101 shown in FIG. 1 receives a query from the user terminal 330. Upon reception of the query, the transaction executing unit 140 reads out of the primary DB 119 of the primary storage system 110 a DB page that is to be referred to or updated, and loads the read DB page onto the DB buffer 102. In the case where the request received from the user terminal 330 is an update request, the transaction executing unit 104 updates the DB page in the DB buffer 102. The updated DB page is written in the primary storage system 110 by the delayed write unit 106. A DB page is one of units used by the primary DBMS 101 in managing data (the primary DB 119 and the secondary DB 129) and, as will be described later, has a data configuration containing pieces of row data.

The writing of an updated DB page by the delayed write unit 106 is asynchronous with an update in the DB buffer 102 in order to avoid lowering the performance of the primary DBMS 101. The delayed write unit 106 writes an updated part of the DB buffer 102 in the primary storage system 110 at regular intervals, or writes in the primary storage system 110 when an update of given amount or more is made to a DB page in the DB buffer 102 or upon instruction from a user or an administrator. The transaction log management unit 105 makes sure that a differential transaction log is written in the log buffer 103 to improve the reliability of the primary DB 119. When an update that meets the condition is committed, a differential transaction log is written in the log 118 of the primary storage system 110 in sync with the commitment.

The transaction executing unit 104 of the primary DBMS 101 activates the unnecessary information removing unit 400 each time a DB page is updated in the DB buffer 102. The unnecessary information removing unit 400 judges whether or not an updated DB page has an unused area (unnecessary information) and, when there is an unused area (unnecessary area), clears the unused area by writing a preset, same character or value in succession.

The configuration management unit 401 of the primary DBMS 101 can set whether the unnecessary information removing unit 400 is enabled or disabled as requested by an administrator or a user or by the transaction log management unit 105. This is because the unnecessary information removing processing is needed only in synchronization processing between the primary DB 119 and the secondary DB 129, and the function of the unnecessary information removing unit 400 is disabled for the rest of the time in order to prevent the primary server 100 from needlessly spending its processing capability on the unnecessary information removing processing. In short, the configuration management unit 401 enables or disables the function of the unnecessary information removing unit 400 upon instruction from the user terminal 330 or the management terminal 340. When notified by the transaction log management unit 105 of turning off of the log creating function, the configuration management unit 401 judges that processing of updating the entire primary DB 119 such as log-less batch processing is about to be executed, and enables the function of the unnecessary information removing unit 400. In the case where log-less batch processing is repeated periodically at night or on holidays, the configuration management unit 401 may enable the unnecessary information removing unit 400 as a scheduled batch processing start time arrives and disable the unnecessary information removing unit 400 as this round of batch processing comes to an end.

<General Description of a DB Page>

Figure 3:
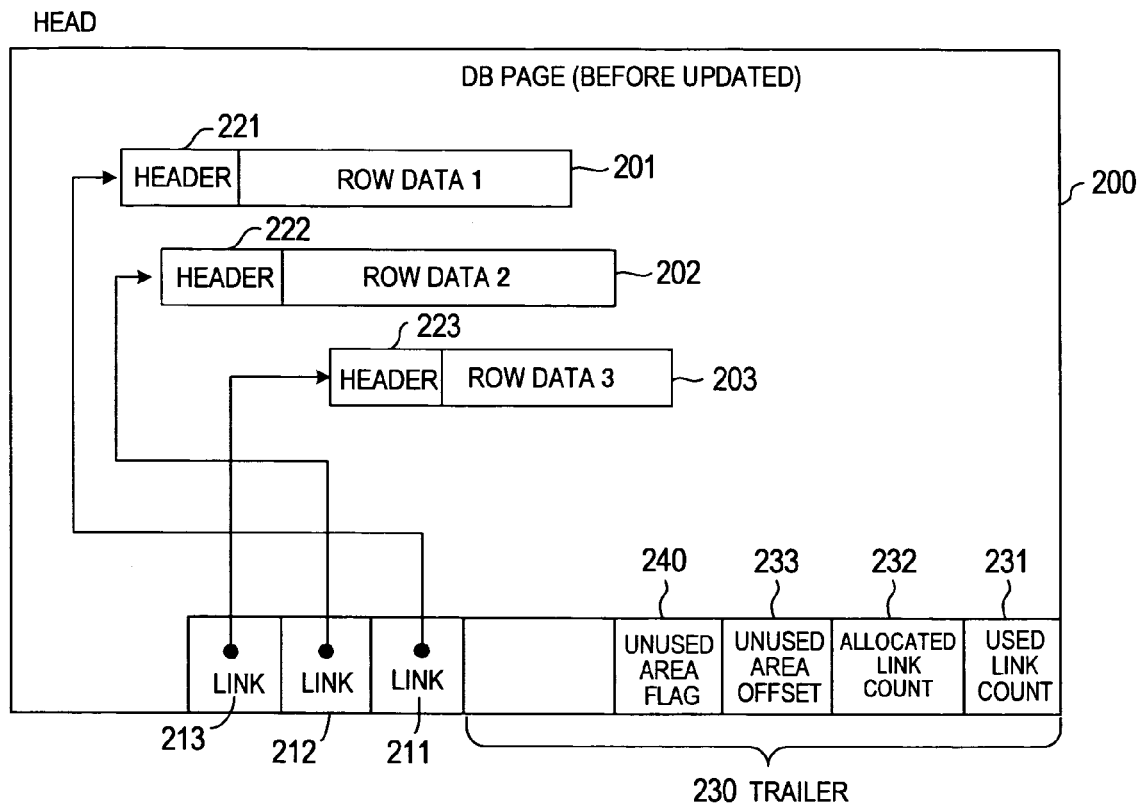
FIG. 3 is an explanatory diagram showing the configuration of a database page according to the first embodiment.

A DB page will be described next. FIG. 3 is an explanatory diagram showing the internal configuration of a DB page 200 which constitutes the primary DB 119 (the secondary DB 129). The primary DB 119 is composed of a few or many DB pages 200.

Recorded in the DB page 200 are plural row data pieces 201 to 203. The row data pieces 201 to 203 are composed of headers 221 to 223 and data portions (areas remaining after removing the headers 221 to 223 from 201 to 203 in FIG. 3). The headers 221 to 223 record the lengths of the rows (row data). The data portions store such data as character strings and values. This embodiment shows an example in which the row data pieces 201 to 203 are variable length data.

In addition to row data pieces 201 to 203, control information pieces, specifically, links 211 to 213 and a trailer 230 are contained in one DB page 200. The DB page 200 of this embodiment places the trailer 230 at a tail end (right bottom in the drawing) address of the area of the DB page 200 whereas the row data pieces 201 to 203 are stored sequentially starting from a head (left top in the drawing) address of the area of the DB page 200. The links 211 to 213 are stored sequentially starting from a head address of the trailer 230 toward the head address of the DB page 200.

The links 211 to 213 are associated with the row data pieces 201 to 203, respectively, and offset values with respect to their associated row data pieces 201 to 203 (in the DB page) are stored in the links 211 to 213. Usually, positive integers smaller than a value that is obtained by subtracting the trailer 230 from the size of the DB page 200 are stored in the links 211 to 213. For instance, offset values with respect to the head address of the area of the DB page 200 are set to the links 211 to 213. When a piece of row data is deleted, a value invalid to the primary DBMS 101 (e.g., a negative integer) is recorded in a link that is associated with the deleted row data piece.

Set in the trailer 230 are a used link count 231, which indicates the count of links (the count of row data pieces) used in the DB page 200, an allocated link count 232, which indicates the count of links that have been allocated to the area of the DB page 200, an unused area offset 233, which points to a part of the area of the DB page 200 that is not in use, and an unused area flag 240, which indicates whether or not there is an unused area that is out of use as a result of an update or deletion of one of row data pieces in the DB page 200.

The allocated link count 232 indicates the count of the links 211 to 213 allocated for the row data pieces 201 to 203 whereas the used link count 231 indicates how many links out of the allocated links are valid. Therefore, when a row data piece is deleted, for example, the used link count 231 alone is reduced by 1. When a row data piece is added, on the other hand, the used link count 231 and the allocated link count 232 are both increased.

The unused area offset 233 indicates an offset with respect to an unused area in the DB page 200. The unused area offset 233 in the example of FIG. 3 is a tail end address of the last row data piece 203. Accordingly, a point indicated by the unused area offset 233 serves as a start point in writing the header and data portion of a row data that is to be newly added.

The row data pieces 201 to 203, the headers 221 to 223, and the control information in the thus configured DB page 200 are updated by the primary DBMS 101. Also, the unnecessary information removing unit 400 updates the row data 202 and the control information in the DB page 200 as will be described later.

To insert a row data piece in one DB page 200, for instance, the row data piece is created in a free area within the DB page 200 and a pointer to a link to this row data piece is recorded in the DB page 200. To refer to a row data piece, the link is consulted and data of a length that is written in the relevant header is read as a row data piece. To delete a row data piece, only the link area is changed and the data body is left intact since the primary DBMS 101 is designed to secure the online performance.

Figure 4:
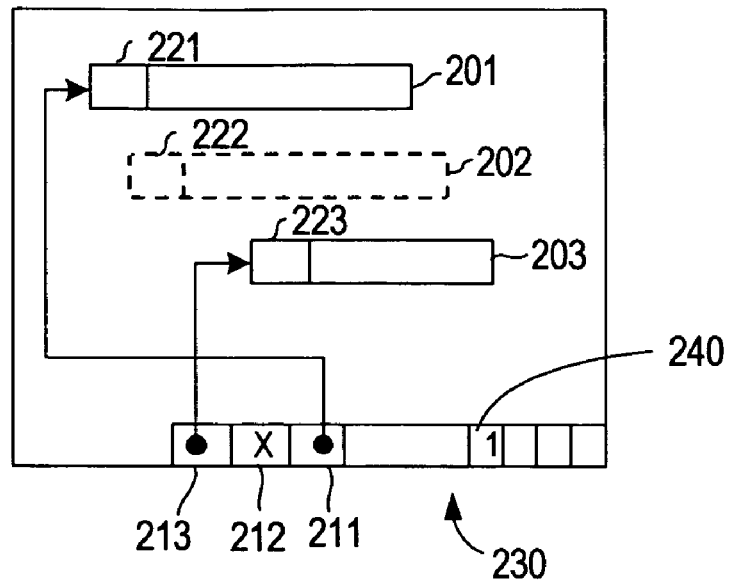
FIG. 4 is an explanatory diagram showing the contents of a database page of when row data is deleted according to the first embodiment.

The primary DBMS 101 executes processing shown in FIG. 4 to delete a row data piece, for example. FIG. 4 is an explanatory diagram showing how the DB page 200 looks after the row data piece 202 of FIG. 3 is deleted.

To delete the row data piece 202, the primary DBMS 101 writes a given invalid value (negative value) in the link 212, which is associated with the row data piece 202 and the header 222 to be deleted. This invalidates offset values of the header 222 and the row data piece 202, and the primary DBMS 101 can no longer access the row data piece 202. The header 222 and the row data piece 202, which actually remain in the area of the DB page 200, are seemingly erased by invalidating their address information.

The area of the row data piece 202 and the header 222 is now out of use. The primary DBMS 101 sets the unused area flag 240 to "1" to show that an unused area containing unnecessary information is generated in this DB page 200. "0" set to the unused area flag 240 indicates that the DB page 200 does not have an unused area (unnecessary information). The term "unnecessary information" means a part of the area of the DB page 200 that is not consulted through the links 211 to 213 and that stores non-recurring values or a string of non-recurring characters.

Figure 5:
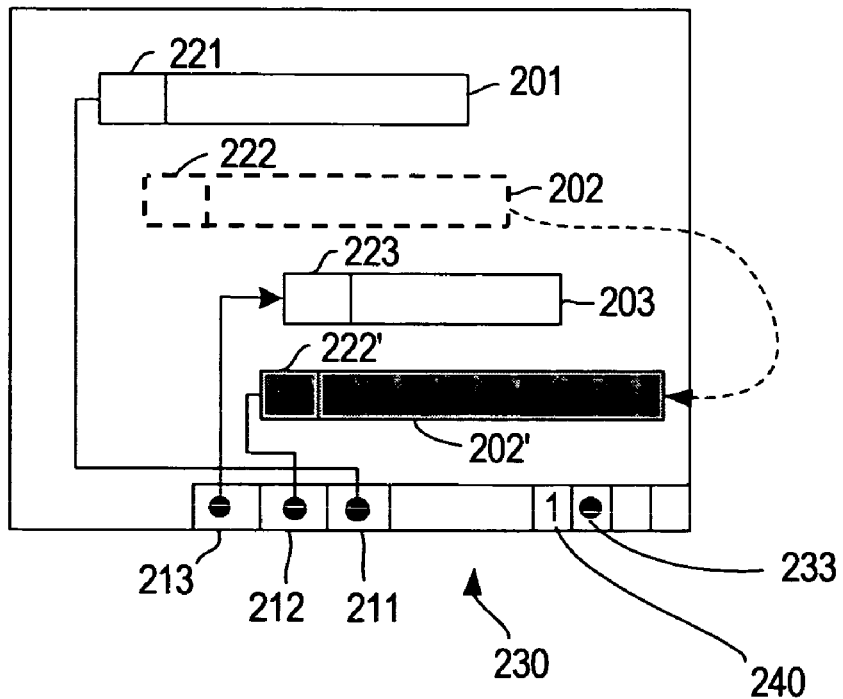
FIG. 5 is an explanatory diagram showing the contents of a database page of when the length of row data is increased according to the first embodiment.

In some cases, the length of a row data piece increases when the primary DBMS 101 updates the row data piece. FIG. 5 is an explanatory diagram showing how the DB page 200 looks when the row data piece 202 of FIG. 3 is updated and lengthened as a result.

With the length of the row data piece 202 increased as a result of updating the row data piece 202, the primary DBMS 101 turns the current row data piece 202 into an unused area to copy the row data piece 202 in a new unused area and updates the row data piece 202. The increase in data length of the row data piece 202 makes it impossible to store a row data piece 202' and a header 222', which represent the row data piece 202 and the header 222 after the update, between the tail end address of the preceding row data piece 201 and the head address of the following row data piece 203.

The primary DBMS 101 reads the value of the unused area offset 233 in the DB page 200 and writes with an address indicated by the read value as a starting point. In FIG. 5, the tail end of the row data piece 203, which is the last row data in the DB page 200, is recorded as the value of the unused area offset 233. The primary DBMS 101 writes the post-update header 222' and row data piece 202' with the tail end address of the last row data piece 203 as a starting point. The primary DBMS 101 then changes the offset of the head address of the header 222' for the row data piece 202' to a new value subsequent to the row data piece 203, and writes the value in the link 212. The last row data in the DB page 200 is now the post-update row data piece 202', and an offset of the tail end address of the row data piece 202', which is the tail end of the new unused area, is recorded as the unused area offset 233. Alternatively, link operation for when there is a change in row length may be as follows. That is, a negative value is recorded as the old link 212, a new link is allocated, and an offset of the row data piece 202' is recorded as the new link.

As described above, a case in which the data length of row data increases is similar to a case in which the data is deleted, and an unused area is generated in the DB page 200 to update only the control information such as the link 212 and a pointer while keeping pre-update data intact.

<Outline of Data Compression>

As shown in FIGS. 3 to 5, the primary DBMS 101 deletes and updates data of the DB 119 by rewriting control information alone while leaving old data. This DB processing contains only the minimum processing necessary, and therefore is effective from the viewpoint of securing the online performance of the primary DBMS 101 whereas it could lower the compression ratio in the network device 140 in transferring the primary DB 119 to the secondary site 2 for synchronization processing. It is easy for the data compressing unit 141 of the network device 140 to raise the data compression ratio when the same value or character appears in succession.

This invention therefore has paid attention to the contents of an unused area in the DB page 200 and the data compression characteristics of the network device 140, and has concluded that it is desirable to update unnecessary information in the DB page 200 with a succession of the same character or value prior to synchronization processing between the primary site 1 and the secondary site 2.

Figure 6:
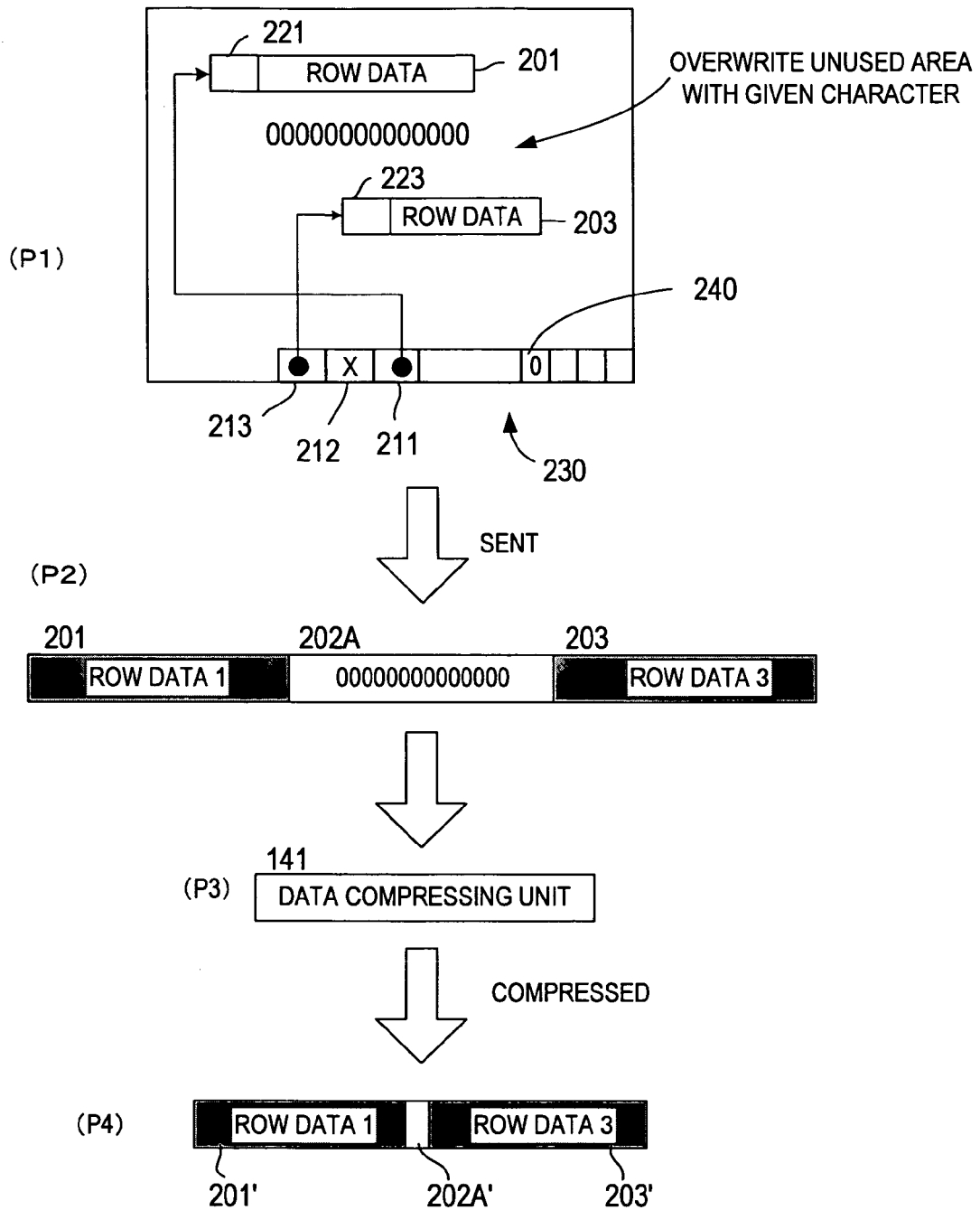
FIG. 6 is an explanatory diagram showing the flow of processing according to the first embodiment.

FIG. 6 is an explanatory diagram outlining this invention. As shown in P1 of FIG. 6, the primary DBMS 101 of the primary site 1 first activates the unnecessary information removing unit 400 each time an update or deletion is carried out, and the unnecessary information removing unit 400 overwrites unnecessary information (the row data piece 202 in the DB page 200) contained in an unused area of the DB page 200 successively with the same given character or value such as "0" (clears the unnecessary information with 0). In synchronization processing between the primary DB 119 and the secondary DB 129, the primary DB 119 cleared of unnecessary information is compressed by the network device 140 and then transferred to the secondary site 2 (P2). Data of the primary DB 119 sent from the primary storage system 110 is not compressed yet as shown in P2 of FIG. 6, and what is written in the DB page 200 by the primary DBMS 101 is sent to the network device 140 as it is. The area of the row data piece 203 deleted as shown in FIG. 3 is turned in P1 of FIG. 6 into an unused area 202A, which is overwritten successively with the same given character or value.

Data of the primary DB 119 is compressed by the data compressing unit 141 of the network device 140 in the primary site 1 (P3). The compression ratio here does not improve if the row data piece 201, which precedes the unused area 202A, and the row data piece 203, which follows the unused area 202A, have many non-recurring values. In contrast, the unused area 202A, having the same character or value that appears in succession as a result of being overwritten successively with the same given character or value in P1 of FIG. 6, can be compressed to a great degree by the data compressing unit 141 of the network device 140 (P4).

After the unused area 202A is thus compressed significantly, compressed data pieces 201', 202A', and 203' are sent from the network device 140 to the network 320, which is a WAN or other types of narrow-band network. The network device 150 in the secondary site 2 expands the received data to the original data size, and transfers the expanded data to the secondary storage system 120, where the transferred data is stored to synchronize the secondary DB 129 with the primary DB 119.

Since unnecessary information remaining in an unused area of the DB page 200 is cleared with 0 before the DB page 200 is transferred as described above, a high compression ratio can be expected from the network devices 140 and 150 in this invention. This makes it possible to complete database synchronization processing in a reasonable length of time without complicating the processing while employing a narrow-band network for the network 320, which connects the primary storage system 110 and the secondary storage system 120. The running cost of a DR system can thus be kept low.

<Details of the Processing>

Figure 7:
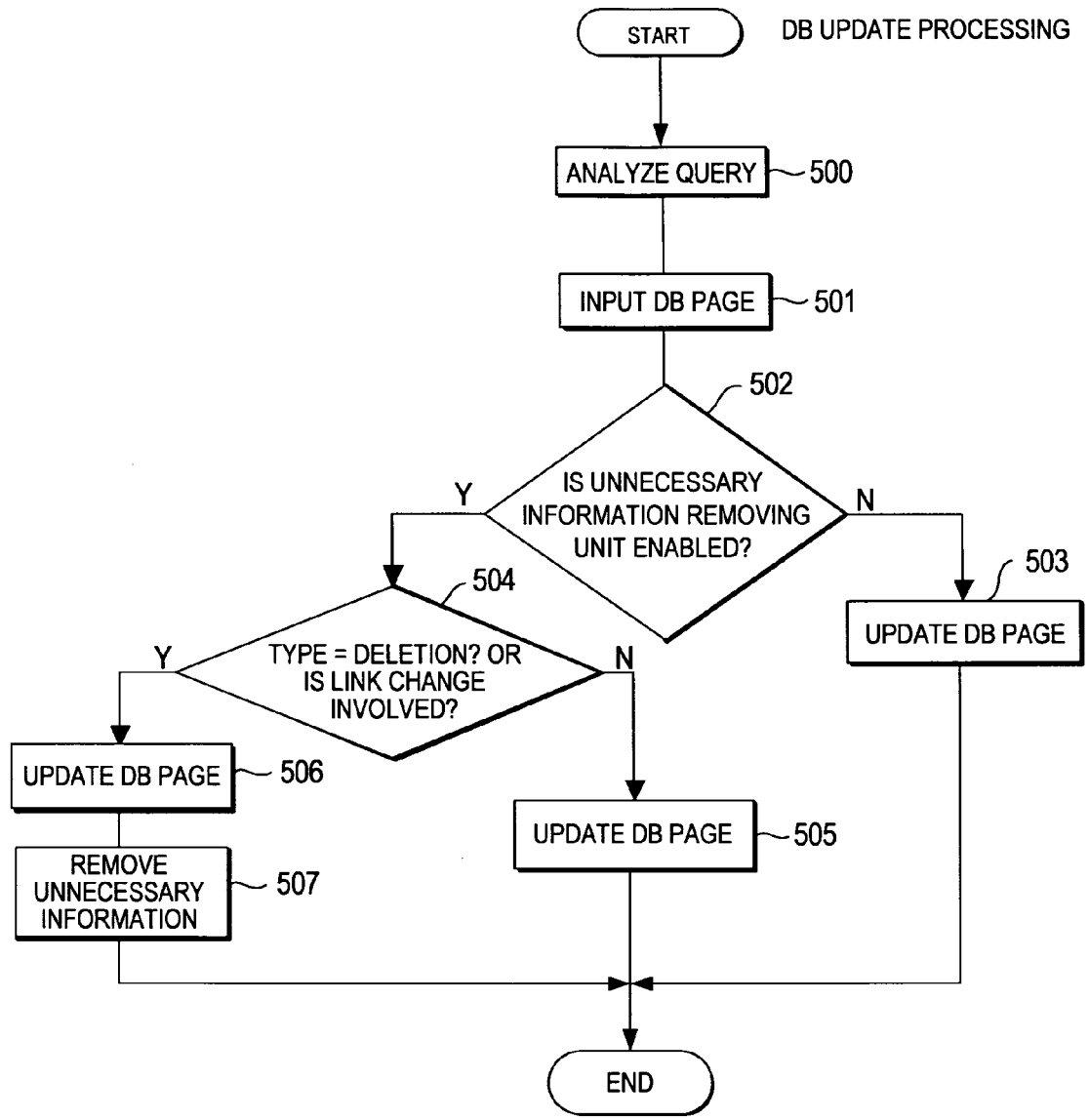
FIG. 7 is a flow chart showing the flow of processing that is executed by a transaction implementing unit of a primary site DBMS according to the first embodiment.

A description will be given below on an example of details of the processing executed by the primary DBMS 101. FIG. 7 is a flow chart of processing executed in the primary DBMS 101 to update the DB page 200 each time a request (query) is received from the user terminal 330 or the like.

In FIG. 7, the transaction executing unit 104 of the primary DBMS 101 analyzes the received query and creates a query plan (500). With the query plan, which DB page 200 is necessary for the requested processing can be identified. The necessary DB page 200 is retrieved and inputted from the primary storage system 110 or the DB buffer 102 (501).

The transaction executing unit 104 inputs the identified DB page 200 from the DB buffer 102 when the identified DB page 200 is in the DB buffer 102. When the identified DB page 200 is not found in the buffer 102, the DB page 200 is read out of the primary storage system 110 onto the DB buffer 102 and inputted in the transaction executing unit 104.

Next, whether the unnecessary information removing unit 400 is enable or not is checked in the configuration management unit 401 (502). When the unnecessary information removing unit 400 is not enable, the transaction executing unit 401 updates the DB page 200 (503).

When the unnecessary information removing unit 400 is enable, the transaction executing unit 104 judges whether or not this DB page 200 needs unnecessary information removing processing for an unused area (504). In other words, the transaction executing unit 104 judges whether or not the type of the query analyzed in Step 500 is row data deletion or processing that involves changing a link (the increase in row length described above with reference to FIG. 5). When it is judged as a result that the unnecessary information removing processing is not needed, the transaction executing unit 104 updates the DB page 200. When it is judged that the unnecessary information removing processing is needed, the unnecessary information removing unit 400 is called up after the DB page 200 is updated (506, 507).

Figure 8:
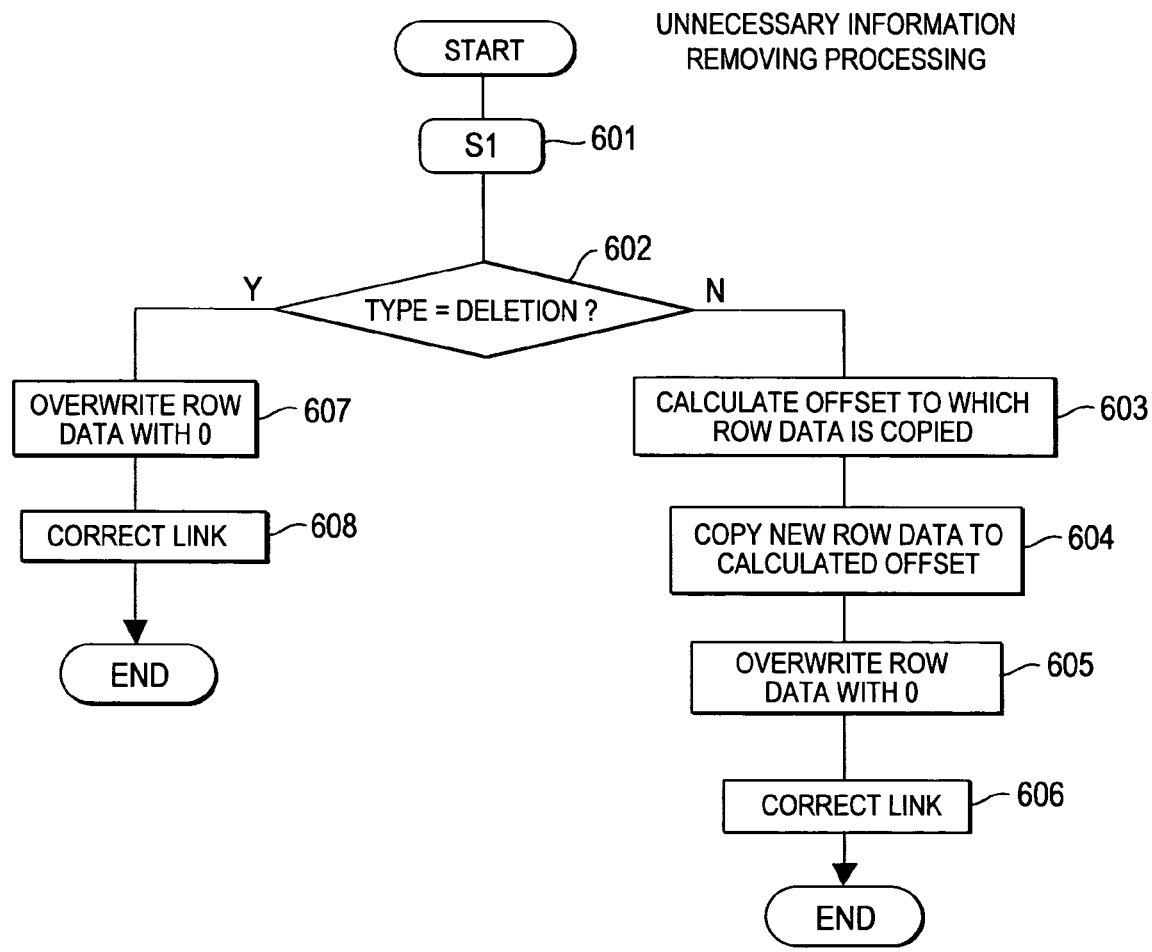
FIG. 8 is a flow chart showing the flow of processing that is executed by unnecessary information removing unit 400 of the primary site DBMS according to the first embodiment.

FIG. 8 is a flow chart showing an example of processing by the unnecessary information removing unit 400, which is called up in Step 507 of FIG. 7.

The unnecessary information removing unit 400 first identifies what type of update is made to the DB page 200 (602). The unnecessary information removing unit 400 moves to Step 608 when the type of update made to the DB page 200 is deletion, and to Step 603 when the update made is of other types than deletion.

In the case where the type of update made to the DB page 200 is deletion, the entire area (including the header 222) of a row data piece to be deleted (for example, the row data piece 202 in the DB page 200 of FIG. 4) is overwritten successively with the same given character (or value) "0" (608). The area in which a given character (or value) is to be written (an unused area) has as its head address an address pointed by the link to be deleted and, as its tail end address, an address obtained by adding the value of the header 221 to the head address. Then the unused area is overwritten successively with the same character or value from the head address to the end address. For instance, in the case of deleting the row data piece 202 as shown in FIG. 4, the unused area is an area between an address that is pointed by the link 212 and an address obtained by adding the value of the header 222 to the former address. The link 211 has not been updated at this point and therefore the header 222 can be consulted.

The value of an associated link (e.g., the link 212 of FIG. 4) is updated with a negative value which is a given invalid value (608). The unnecessary information removing unit 400 reduces the value of the used link count 231 in the trailer 230 by 1, and ends the processing.

In the case where the type of update made to the DB page 200 is not deletion, in other words, when a link is to be changed, the processing proceeds to Step 603. A link is changed when, for example, a post-update row data piece is copied to another area to accommodate a size change of a row data piece like the row data piece 202' of FIG. 5. When a link is to be changed, an offset value to which the post-update row data piece is copied is calculated (604). For instance, the unused area offset 233 is used in the case where the data is copied within the same page.

The unnecessary information removing unit 400 next copies the post-update row data to an address smaller than the offset value calculated in the above (604). Thereafter, the unnecessary information removing unit 400 overwrites the entire area of the pre-update row data successively with the same given character (or value) "0" (605). The unnecessary information removing unit 400 also replaces the value of the link that is associated with the pre-update row data with the offset value obtained in Step 603 (606). The value of the unused area offset 233 is changed so that it points to the tail end address of the post-update data. The processing is then ended.

Through the above processing, when row data is deleted or a link is changed, the unnecessary information removing unit 400 overwrites an unused area in the DB page 200 that is read onto the DB buffer 102 successively with the same given value and thereby clears unnecessary information. Thereafter, the delayed write unit 106 writes the DB page 200 of the DB buffer 102 in the primary DB 119.

The primary DBMS 101 executes synchronization processing after nighttime log-less batch processing is completed, or when remote copy is resumed after a line failure or the like causes the primary site 1 to temporarily stop remote copy.

This synchronization processing is started as the primary DBMS 101 instructs the primary storage system 110 to transfer the primary DB 119 to the secondary site 2. The primary storage system 110 transfers data of the primary DB 119 from the network device 140 via the network 320 to the secondary storage system 120.

The network device 140 is capable of efficiently compressing a succession of the same value using the data compressing unit 141 as shown in FIG. 6. The unused area 202A of the DB page 200 that is cleared with 0 is therefore compressed at a very high compression ratio and the substantial transfer amount of the primary DB 119 can be reduced greatly. With the capacity of the transferred primary DB 119 made very small, the synchronization processing can be completed in a shorter period of time than in prior art despite employing a narrow-band network for the network 320 which connects the primary storage system 110 and the secondary storage system 120. For instance, in the case where log-less batch processing is started late at night and ended early in the morning, the synchronization processing of the primary DB 119 and the secondary DB 129 can be completed within a period between early morning and the time the business begins for the day.

As described above, this invention makes it possible to carry out the synchronization processing over the low-cost network 320 without needing to add special hardware and without burdening the administrator. The running cost of a DR system can thus be kept low.

Figure 9:
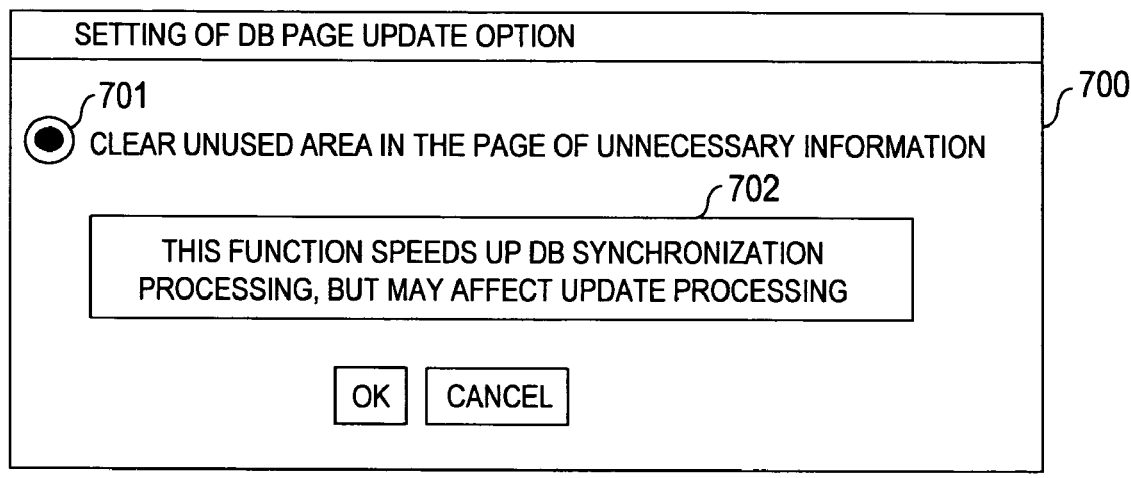
FIG. 9 is a screen image showing an example of a user interface which is provided to a management terminal according to the first embodiment.

To enable or disable the unnecessary information removing unit 400 with the management terminal 340 or others instead of the configuration management unit 401, the configuration management unit 401 may provide a setting screen (user interface) 700 shown in FIG. 9 to the management terminal 340. FIG. 9 is an explanatory diagram showing an example of a display screen of the management terminal 340.

In FIG. 9, whether the unnecessary information removing unit 400 is enabled or disabled is set with the use of a check box (radio button) 701, for example. When an "OK" button in the drawing is clicked while the check box 701 is selected with a click or the like, the configuration management unit 401 enables the unnecessary information removing unit 400. When the check box 701 is unchecked, the configuration management unit 401 disables the unnecessary information removing unit 400.

The user interface of FIG. 9 may have a display portion 702 for informing users of the possibility of affecting the processing performance of the primary DBMS 101 by enabling the unnecessary information removing unit 400. The user interface 700 as this allows an administrator to enable unnecessary information removing processing in DB synchronization or the like.

Second Embodiment

Figure 10:
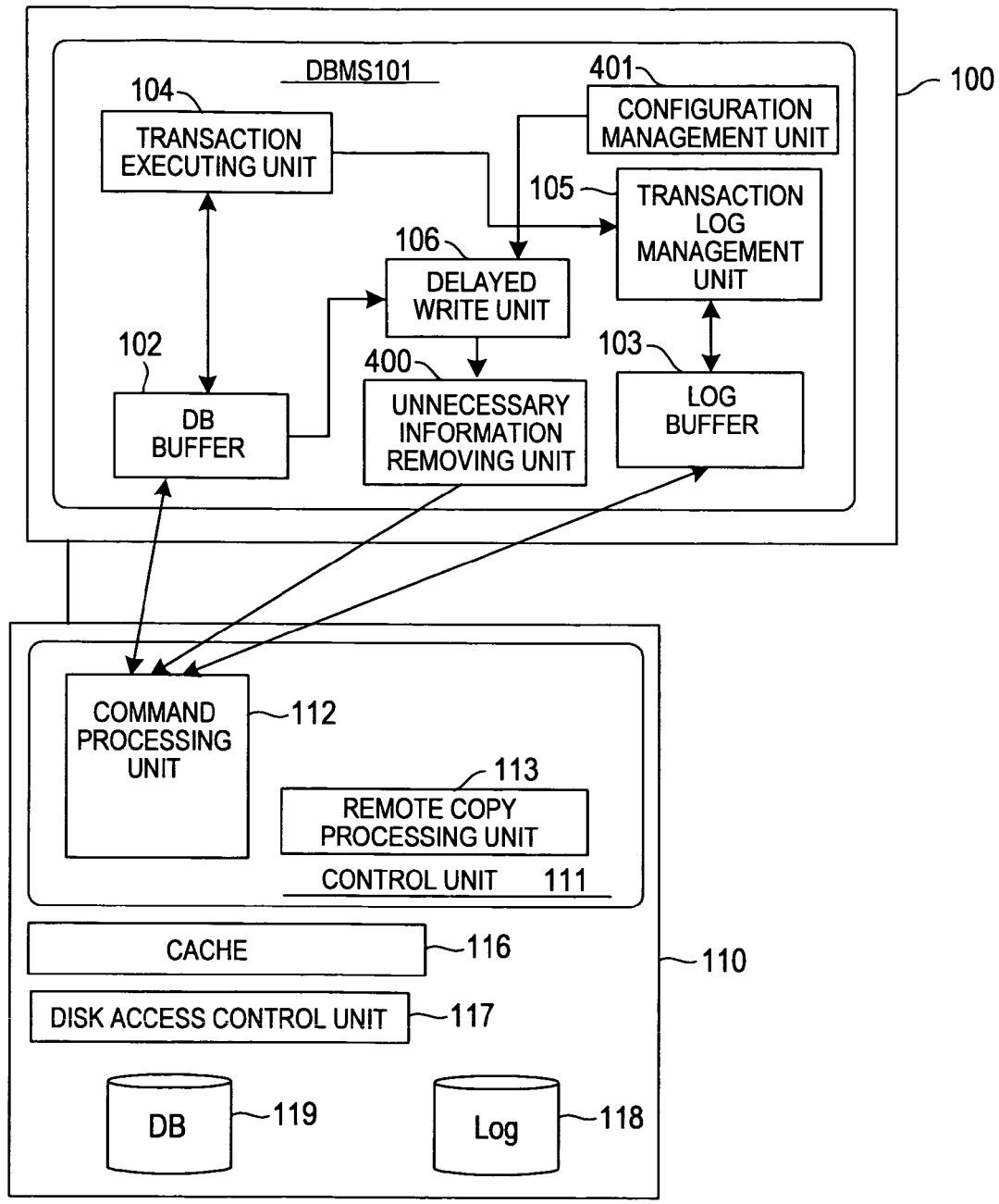
FIG. 10 is a block diagram showing the configurations of a primary DBMS and a primary storage system which are placed in a primary site according to a second embodiment of this invention.

FIG. 10 is a block diagram showing the primary DBMS 101 and primary storage system 110 of the primary site 1 according to a second embodiment. The second embodiment is a variation of the first embodiment that makes the unnecessary information removing unit 400 function when the delayed write unit 106 writes the DB page 200 in the primary DB 119, and the rest of the configuration of the second embodiment is the same as the first embodiment.

The unnecessary information removing unit 400 of the second embodiment is called up by the delayed write unit 106 unlike the first embodiment where the transaction executing unit 104 calls up the unnecessary information removing unit 400. Whether the unnecessary information removing unit 400 is enabled or disabled is set by the configuration management unit 401 as in the first embodiment.

The delayed write unit 106 sets when to output a dirty page in the DB buffer 102 (a page in the DB buffer 102 to be written back), so that a dirty page is outputted after, for example, a given period of time passes or a given amount of update is made.

The unnecessary information removing unit 400 is called up when the delayed write unit 106 writes the DB page 200 of the DB buffer 102 in the primary DB 119 of the primary storage system 110.

The unnecessary information removing unit 400 analyzes a page in the DB buffer 102 that is to be written back, overwrites an unused area (unnecessary information) in the DB page 200 with a given character (or value) "0", and then outputs the DB page 200 to the primary storage system 110. In the case where it is the delayed write unit 106 that calls up the unnecessary information removing unit 400, calling up the unnecessary information removing unit 400 once when the DB page 200 is written in the primary storage system 110 irrespective of whether the same area of the DB page 200 is updated once or repeatedly. Therefore, the unnecessary information removing unit 400 is called up a fewer times for one DB page 200 when this DB page 200 is updated more than once, and the influence on the processing performance of the primary DBMS 101 can thus be kept to the minimum.

In the case where it is the transaction executing unit 104 that calls up the unnecessary information removing unit 400 as in the first embodiment, the unnecessary information removing unit 400 is called up each time an update is made to the DB page 200. In the second embodiment, the unnecessary information removing unit 400 is called up only when the delayed write unit 106 writes the DB page 200 of the DB buffer 102 in the primary storage system 110, and therefore the online performance of the primary DBMS 101 is affected less.

One of methods of judging whether there is an unused area (unnecessary information) or not when it is the delayed write unit 106 that calls up the unnecessary information removing unit 400 is to check every link. However, in updating the DB page 200, the transaction executing unit 104 knows what type of update is to be made and can judge whether or not the update produces an unused area. The transaction executing unit 104 therefore sets the unused area flag 240, which indicates the presence or absence of an unused area in the DB page 200, when the DB page 200 is updated. Specifically, the transaction executing unit 104 sets the unused area flag 240 in the trailer 230 of the DB page 200 to "0" when a new DB page 200 is created or when the DB page 200 is newly read onto the DB buffer 102. The transaction executing unit 104 sets the unused area flag 240 to "1" only when such an update that produces an unused area is made to the DB page 200. "0" set to the unused area flag 240 indicates that there is not unused area. Then it is not necessary to analyze individual links and the online performance of the primary DBMS 101 is affected even less.

Figure 11:
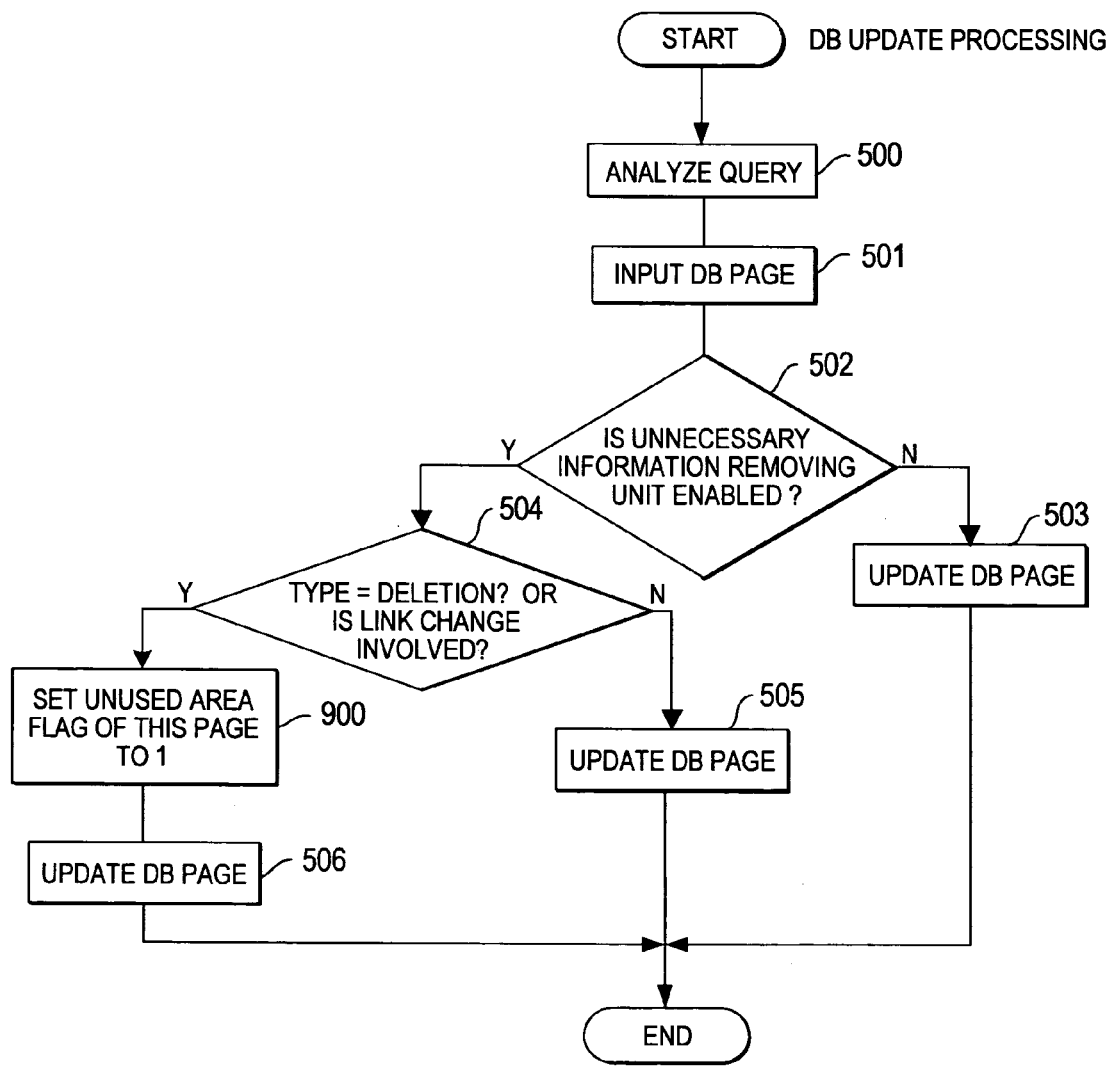
FIG. 11 is a flow chart showing an example of processing that is executed by a transaction implementing unit of the primary site DBMS according to the second embodiment.

Described next is an example of processing that is executed in the primary DBMS 101. FIG. 11 is a flow chart for processing executed in the primary DBMS 101 to update the DB page 200 each time a request (query) is received from the user terminal 330 or the like.

In Steps 500 and 501, the transaction executing unit 104 of the primary DBMS 101 analyzes the received query and creates a query plan as described in the first embodiment with reference to FIG. 7 (500). The created query plan is used to identify which DB page 200 is necessary for the requested processing, and the necessary DB page 200 is inputted from the primary storage system 110 or from the DB buffer 102 (501).

In Step 502, the transaction executing unit 104 checks the configuration management unit 401 to find whether the unnecessary information removing unit 400 is enable or not as described in the first embodiment with reference to FIG. 7. When the unnecessary information removing unit 400 is not enable, the transaction executing unit 104 updates the DB page 200 (503). When the unnecessary information removing unit 400 is enable, the transaction executing unit 104 judges whether unnecessary information removing processing for an unused area is necessary or not (504).

In Step 504, the transaction executing unit 104 judges whether or not the type of the query is row data deletion or processing that involves changing a link as described in the first embodiment with reference to FIG. 7. When it is judged as a result that the unnecessary information removing processing is not needed, the transaction executing unit 104 updates the DB page 200 (505).

When it is judged that the unnecessary information removing processing is needed, the transaction executing unit 104 sets the unused flag 240 in the trailer 230 of the DB page 200 to "1" (900). The transaction executing unit 104 then updates the DB page 200 (506).

The transaction executing unit 104 executes the above processing each time a query is received from the user terminal 330 or the like to update (or refer to) the DB page 200 in the DB buffer 102 and, in the case where the update produces an unused area, sets the unused area flag 240. In short, the transaction executing unit 104 of the second embodiment differs from the prior art example in that it sets the unused area flag 240.

Figure 12:
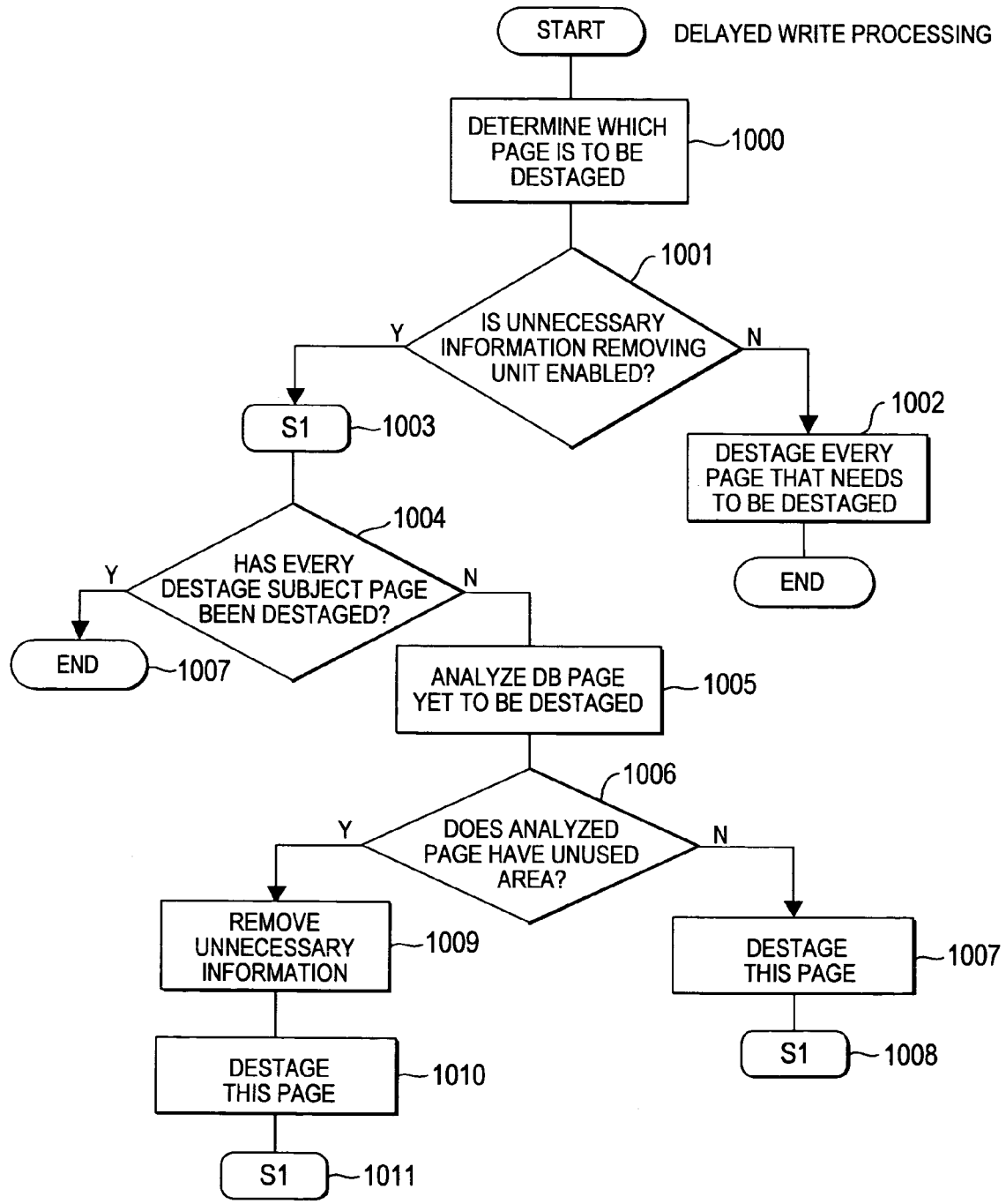
FIG. 12 is a flow chart showing an example of processing that is executed by a delayed write unit of the primary site DBMS according to the second embodiment.

An example of processing executed by the delayed write unit 106 is shown in FIG. 12. The processing of FIG. 12 is executed by the delayed write unit 106 at given timing. For instance, the delayed write unit 106 writes an updated portion of the DB buffer 102 in the primary storage system 110 at regular intervals, or writes updated data in the primary storage system 110 after a given amount of update is made to a DB page in the DB buffer 102 or upon instruction from a user or an administrator.

The delayed write unit 106 first uses a preset condition to identify which dirty page (the DB page 200 that has been updated) is to be destaged (written in the primary storage system 110) (1000). The condition may be set such that every page is destaged, or only a predetermined ratio of dirty pages are destaged.

The delayed write unit 106 asks the configuration management unit 401 about whether the unnecessary information removing unit 400 is enable or not (1001). When it is found that the unnecessary information removing unit 400 is not enable, the delayed write unit 106 destages, as usual, every DB page 200 that is to be destages (1002).

When the unnecessary information removing unit 400 is found out to be enabled, the delayed write unit 106 first judges whether or not every DB page 200 has been destaged (1003, 1004). When there is no DB page 200 left to be destaged, the processing is ended (1007). When the DB page 200 to be destaged is still found in the DB buffer 102, the delayed write unit 106 analyzes this DB page 200 yet to be destaged (1005).

To analyze the DB page 200, the delayed write unit 106 reads the unused area flag 240 in the trailer 230 of the DB page 200 to be analyzed, and the read flag value is used in Step 1006 to judge whether the DB page 200 has an unused area or not.

In Step 1006, when the unused area flag 240 is "1", it is judged that there is an unused area and the processing proceeds to Step 1009 and, when the unused area flag 240 is "0", it is judged that there is no unused area and the processing proceeds to Step 1007.

In Step 1007, which is reached after concluding that there is no unused area, the subject DB page 200 is destaged as it is and the processing returns to Step S1 (1008).

In Step 1009, which is reached after concluding that there is an unused area, the unnecessary information removing unit 400 is called up to write successively the same given character (e.g., "0") in the unused area of the subject DB page 200. The processing of Step 1009 is similar to the processing that is described in the first embodiment with reference to FIG. 8. The update type identification in Step 602 of FIG. 8 is made here by the unnecessary information removing unit 400, and the type of update is judged as deletion when a given invalid value (e.g., a negative value) is found in the relevant link.

After the unnecessary information removing processing is completed, the subject DB page 200 is destaged (1010), and the processing returns to Step S1 (1011).

As described above, in the case where the unnecessary information removing unit 400 is enable, the delayed write unit 106 reads the unused flag 240 in the trailer 230 of the DB page 200, and judges whether there is an unused area or not for each DB page 200. When an unused area is found, the same given character or value is written successively in the unused area as pre-processing for synchronization. This processing and above processing are performed on every DB page 200 to be destaged, and then the processing is ended.

The second embodiment, where the unnecessary information removing unit 400 is called up when the delayed write unit 106 starts functioning as has been described, eliminates the need to perform unnecessary information removing processing each time an update is made to the DB page 200 that has an unused area, and thus lessens the load on the primary server 100. This allows the primary server 100 to allocate its processing capability to the processing of the primary DBMS 101, thereby keeping the transaction processing performance from lowering.

The above description shows an example in which the delayed write unit 106 analyzes the DB page 200 in Step 1005. Alternatively, the unnecessary information removing unit 400 may execute the processing of Step 1005.

Third Embodiment

Figure 13:
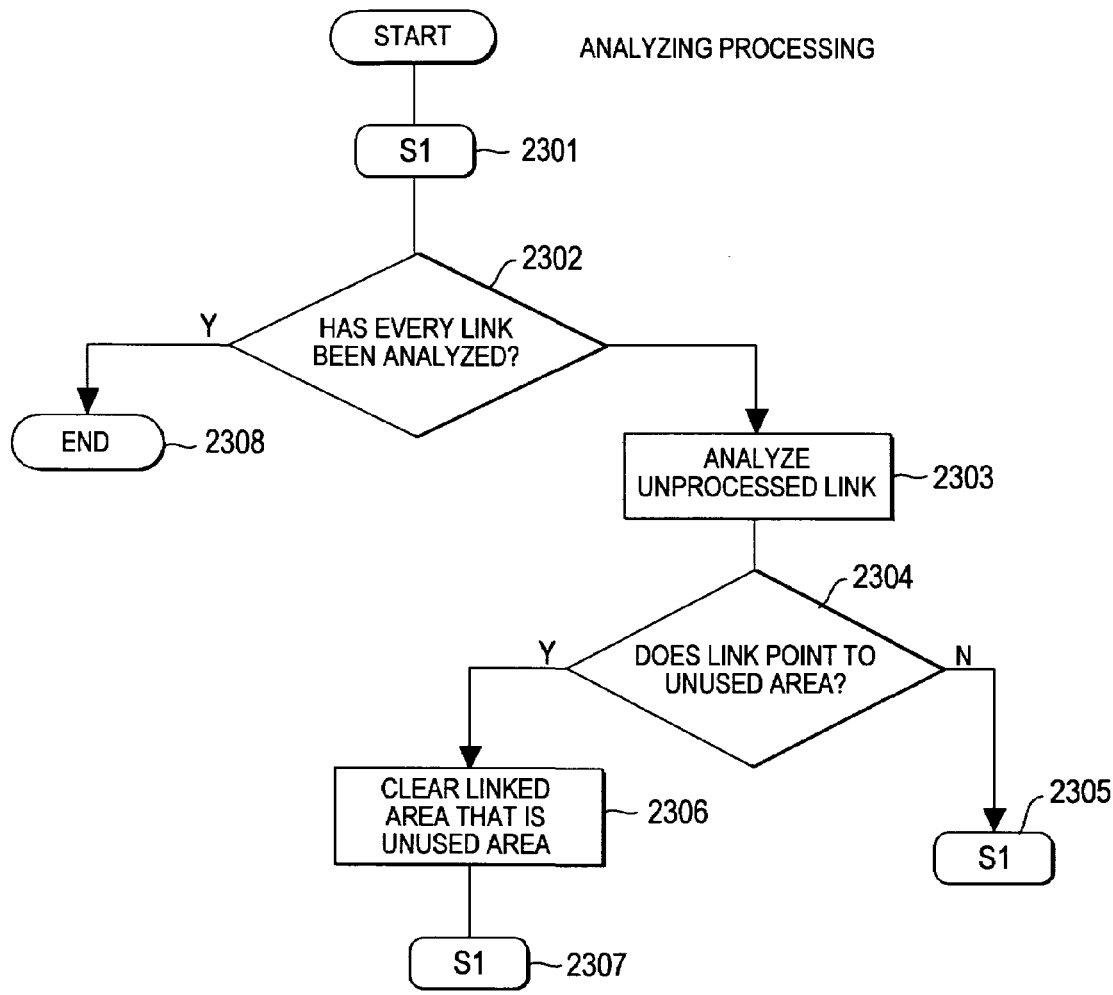
FIG. 13 is a flow chart showing an example of processing that is executed by a delayed write unit and unnecessary information removing unit of a primary site DBMS according to a third embodiment of this invention.

FIG. 13 shows a third embodiment in which the processing of analyzing the DB page 200 (Step 1005 of FIG. 12) and unnecessary information removing processing (Step 1009 of FIG. 12) of the second embodiment are executed by analyzing the links 211 to 213 of FIG. 3. The rest of the configuration of the third embodiment is the same as the second embodiment.

In the second embodiment, the delayed write unit 106 judges whether there is an unused area or not from the value of the unused area flag 240. The third embodiment shows a case in which the delayed write unit 106 does not use the unused area flag 240 of the DB page 200 (or a case in which the DB page 200 does not have the unused area flag 240).

FIG. 13 is a flow chart for when the processing of Steps 1005, 1006, and 1009 shown in FIG. 12 is executed by the delayed write unit 106 and the unnecessary information removing unit 400 based on the links 211 to 213 of the DB page 200.

First, in Step 2302, the delayed write unit 106 judges whether or not all the links in the subject DB page 200, here the links 211 to 213, have been analyzed (2302). In the case where the links 211 to 213 have all been analyzed, the processing is ended (2306). In the case where one or more of the links 211 to 213 have not been analyzed, the processing proceeds to Step 2303.

In Step 2303, the delayed write unit 106 analyzes one or more of the links 211 to 213 that have not been analyzed.

In Step 2304, the delayed write unit 106 judges whether areas pointed by the links 211 to 213 (the row data pieces 201 to 203 and the headers 221 to 223 shown in FIG. 3) are unused areas (unnecessary information) or not. Whether linked areas are unused areas or not can be judged from values recorded as the links 211 to 213. For instance, an area pointed by a link is judged as an unused area when the value of the link is a given invalid value (e.g., a negative integer). In the case where the row data piece 202 and the header 222 are deleted as described above with reference to FIG. 4, a given negative value is set to the link 212, which points to a head address where the row data piece 202 and the header 222 are stored.

Alternatively, it is judged that the DB page 200 has an unused area when the used link count 231 in the DB page 200 is compared against the allocated link count 232 shown in FIG. 3 and found to be smaller than the allocated link count 232.

When the linked area is judged as an unused area (unnecessary information), the processing proceeds to Step 2306. When it is judged that the linked area is not an unused area, the processing returns to Step 1 from Step 2305.

In Step 2306, the unnecessary information removing unit 400 overwrites the unused area successively with the same given character (e.g., "0") as shown in FIG. 6.

The location of an unused area that is to receive the overwrite can be obtained from, in the example of FIG. 6, the valid links 211 and 213 placed before and after the link 212 to which a negative value is set. Specifically, the head address of the unused area is obtained from the link 211, which precedes the link 212 having a negative value, and the tail end address of the unused area is obtained from the link 213, which follows the link 212 having a negative value. The value of the header 221 is retrieved from the link 211, which precedes the link 212 having a negative value, and is added to an address pointed by the link 211 to obtain the tail end address of the row data piece 201. A value obtained by adding 1 to this tail end address serves as the start address of the unused area. The tail end address of the unused area is obtained by subtracting 1 from an address pointed by the link 213, which follows the link 212 having a negative value. In the case where a negative value is set to a link that is no longer used by multiplying the previous value of this link by −1, the location of the unused area may be obtained as follows. That is, the absolute value of the previous value of this link serves as the head address of the unused area. The row length is obtained from the head address. An address obtained by adding the row length to the head address serves as the tail end address of the unused area.

The area beginning and ending at the thus obtained start address and tail end address is overwritten successively with the same given character or value. As a result, the same character or value is stored in succession in the unused area between the start address and the tail end address.

After the above processing is completed, the current DB page 200 is destaged (the processing of Steps 1007 and 1010 in FIG. 12) to analyze every DB page 200 to be destaged and clear an unused area of the DB page 200.

In the above description, data in an area linked from an invalid link is overwritten with 0. Alternatively, a new DB page 200 (entirely overwritten with 0) may be prepared to copy only the trailer 230, a valid link, and row data associated with the valid link.

Fourth Embodiment

Figure 14:
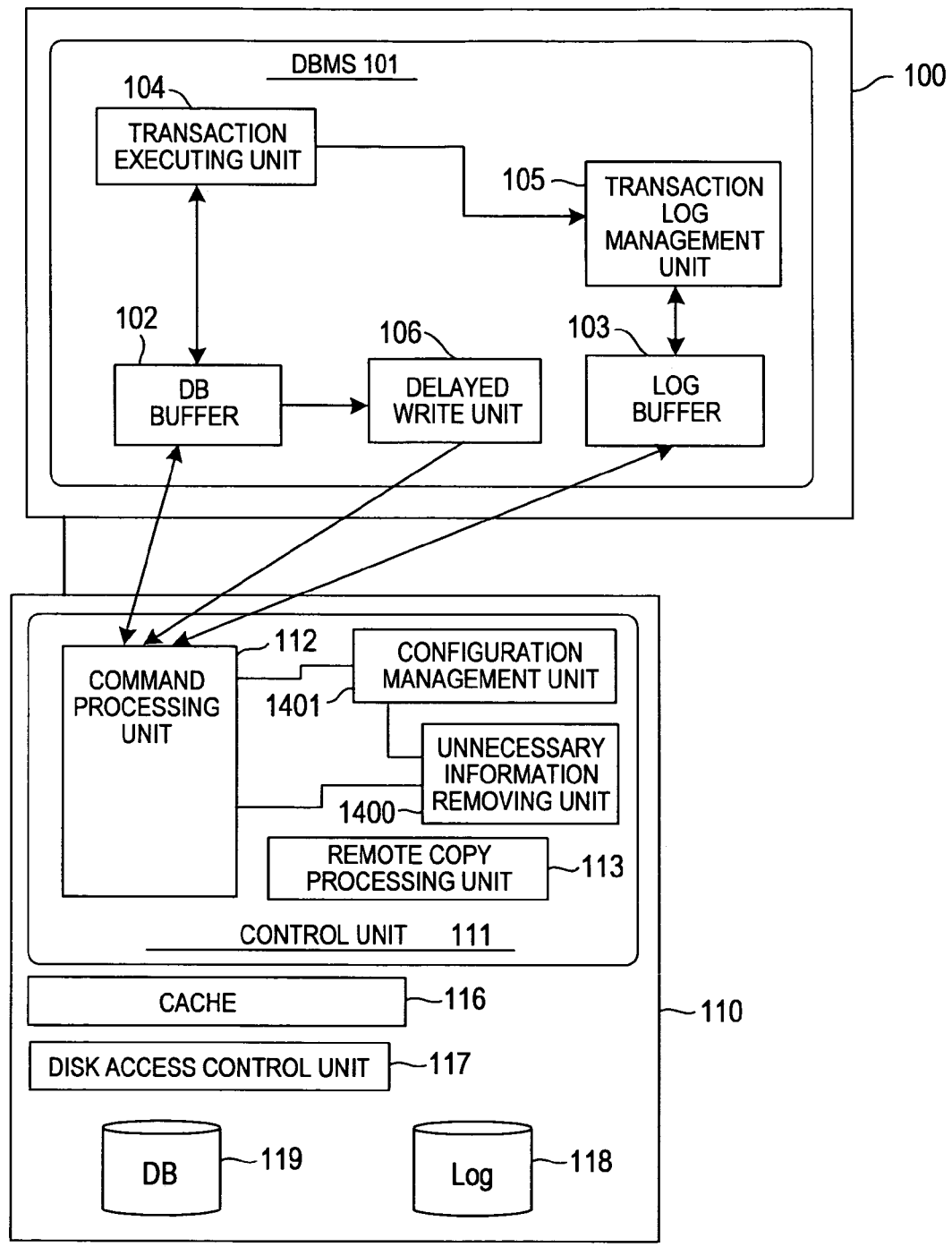
FIG. 14 is a block diagram showing the configurations of a primary DBMS and a primary storage system which are placed in a primary site according to a fourth embodiment of this invention.

FIG. 14 is a block diagram of the primary DBMS 101 and the primary storage system 110 in the primary site 1 according to a fourth embodiment. In the fourth embodiment, the unnecessary information removing unit and configuration management unit of the first embodiment are placed in the control unit 111 of the primary storage system 110. The rest of the configuration of the fourth embodiment is the same as the first embodiment.

The control unit 111 of the primary storage system 110 according to the fourth embodiment is provided with an unnecessary information removing unit 1400, which clears an unused area of the DB page 200 to be written in the primary DB 119 by overwriting the unused area successively with the same given character, and a configuration management unit 1401, which enables or disables the unnecessary information removing unit 1400. Other functional components of the control unit 111 in the fourth embodiment are the same as in the first embodiment.

In installing the unnecessary information removing unit 1400 in the primary storage system 110, the configuration management unit 1401 sets whether the unnecessary information removing function is enable or not, and sets which area is to receive unnecessary information removing processing. In the fourth embodiment, the configuration management unit 1401 is set, in advance, such that the unnecessary information removing unit 1400 is activated when data is write in an area of the primary DB 119.

The first action the command processing unit 112 takes after receiving a write request from the primary DBMS 101 is to judge whether or not the DB page 200 that is to be written in the primary DB 119 needs unnecessary information removing processing.

In the case where data is written in an area set by the configuration management unit 1401 (here, the primary DB 119), the unnecessary information removing unit 1400 analyzes the DB page 200 received from the primary DBMS 101 and judges whether or not the received DB page 200 contains an unused area (unnecessary information), as the unnecessary information removing unit 400 does in the second or third embodiment.

When an unused area is found in this DB page 200, the unnecessary information removing unit 1400 clears the unused area (unnecessary information) in the DB page 200, which is then stored in the cache 126. In transferring the DB page 200 to the secondary storage system 120 to be stored in the cache 126, the remote copy processing unit 113 is called up if the remote copy function of the remote copy processing unit 113 is set to be enable.

After the unnecessary information removing unit 1400 finishes clearing the DB page 200 of the unused area, the command processing unit 112 uses the disk access control unit 117 to write data of the cache 116 in an area of the primary DB 119. The disk access control unit 117 stores received data in a given area of a disk subsystem when update data in the cache 116 reaches a given amount or at regular intervals.

Figure 15:
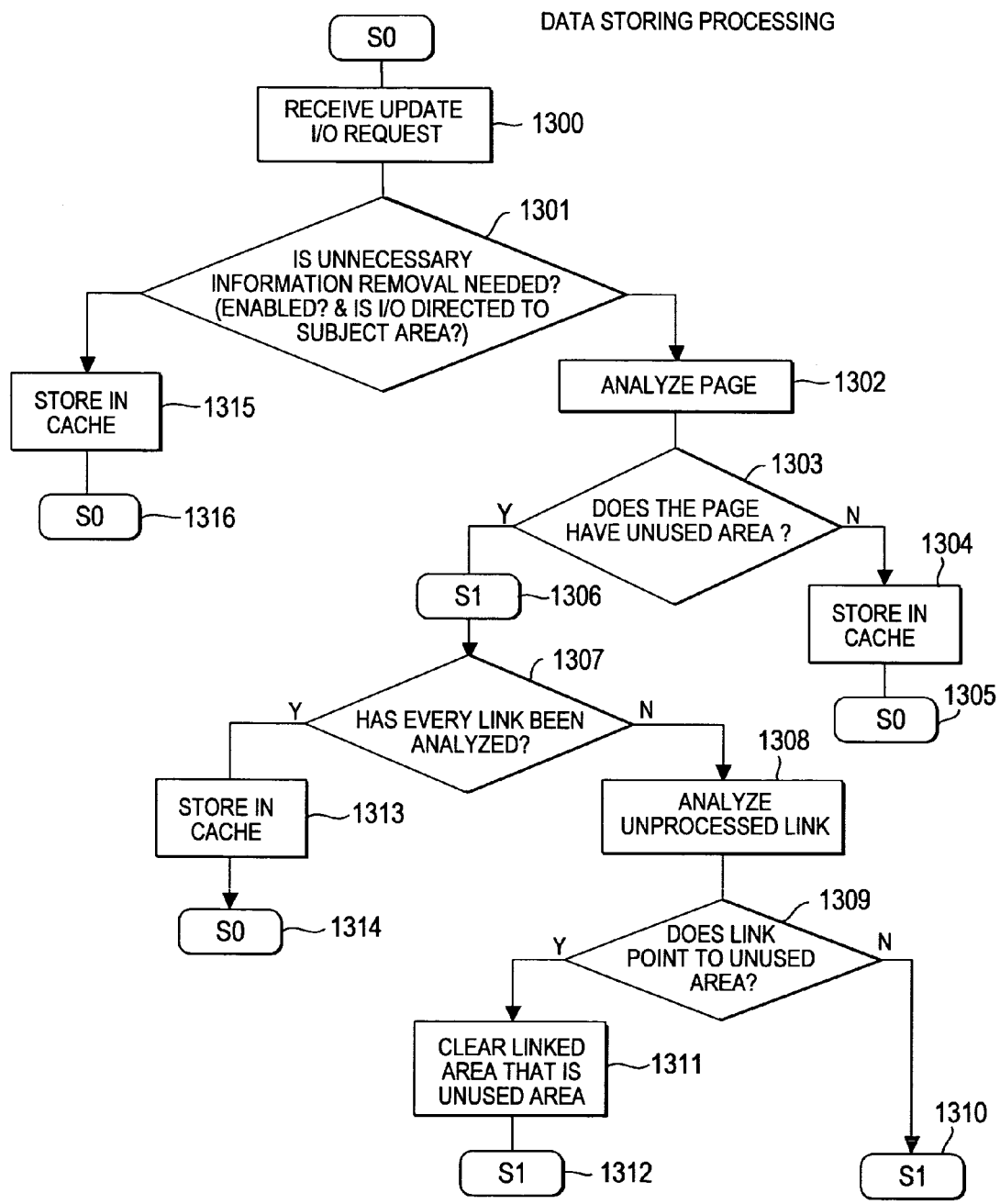
FIG. 15 is a flow chart showing an example of processing that is executed by a control unit of the primary storage system in the primary site according to the fourth embodiment.

FIG. 15 is a flow chart showing an example of data storing processing that is executed by the control unit 111 (the command processing unit 112 and the unnecessary information removing unit 1400) of the primary storage system 110.

The control unit 111 first receives an update request from the primary DBMS 101 (1300). The control unit 111 next asks the configuration management unit 1401 about whether the unnecessary information removing unit 1400 is enable or not (1301). At this point, the control unit 111 also identifies which disk subsystem area is set by the configuration management unit 1401 to be monitored for the emergence of an unused area. The primary DB 119, for example, is set as a disk subsystem area that is to be monitored for the emergence of an unused area.

When the received update request requests to write in an area of the primary DB 119 and the unnecessary information removing unit 1400 is enable in Step 1301, the processing proceeds to Step 1302, where the data (DB page 200) is analyzed.

On the other hand, when the unnecessary information removing unit 1400 is not enable or when the data is requested to be written in other areas than the primary DB 119 (for example, when a log is the data that is requested to be written) in Step 1301, the data of the received update request is written in the cache 116 (1315). Then the data in the cache 116 is asynchronously written in the requested area (volume) by the disk access control unit 117. After storing the data in the cache 116, the processing returns to S0, where the next update request is received.

In the case where the received update request requests to write in a given disk subsystem area that is to be monitored and the unnecessary information removing unit 1400 is enable, the DB page 200 is analyzed (1302).

The unnecessary information removing unit 1400 analyzes the data in Step 1303 to determine whether or not the DB page 200 has an unused area. How to detect an unused area is as described in the second or third embodiment.

In Step 1303, whether the DB page 200 designated by the update request contains an unused area or not is judged from the result of the above analysis. When there is an unused area, the processing moves to S1 to examine the links 211 to 213 in the DB page 200. When the received DB page 200 does not contain an unused area, the DB page 200 is stored in the cache 116 and then the processing returns to S0, where the next update request is received (1304, 1305).

In the case where the DB page 200 has an unused area, whether all the links in the DB page 200, here the links 211 to 213, have been analyzed or not is judged (1306, 1307).

When all the links in the DB page 200 have been analyzed, this DB page 200 is stored in the cache 116 and then the processing returns to S0 (1313, 1314). When there is a link left to be analyzed, whether or not an area associated with this link is an unused area is analyzed in Step 1308. Whether a linked area is an unused area or not is found out in the manner described in the second or third embodiment.

In Step 1309, whether the row data pieces 201 to 203 pointed by the analyzed links 211 to 213 are unused areas or not is judged. When they are unused areas, the processing proceeds to Step 1311. In Step 1311, each unused area is overwritten successively with the same given character (or value). Then the processing returns to S1, where the unused area analysis is repeated until all the links in the DB page 200, here, the links 211 to 213, finish being analyzed (1312).

In the case where areas linked from the analyzed links 211 to 213 are not unused areas, the processing returns to S1, where the unused area analysis is repeated until all the links in the DB page 200, here, the links 211 to 213, finish being analyzed (1310).

As described above, when it is the primary storage system 110 that clears the DB page 200 of an unused area, the command processing unit 112 calls up the unnecessary information removing unit 1400 each time an update request is received from the primary DBMS 101 to overwrite an unused area, if there is any, successively with the same character or value as pre-processing for compression in synchronization processing.

Using the primary storage system 110 to clear an unused area prevents unnecessary information removing processing from lowering the processing performance of the primary server 100 in which the primary DBMS 101 is run.

Figure 16:
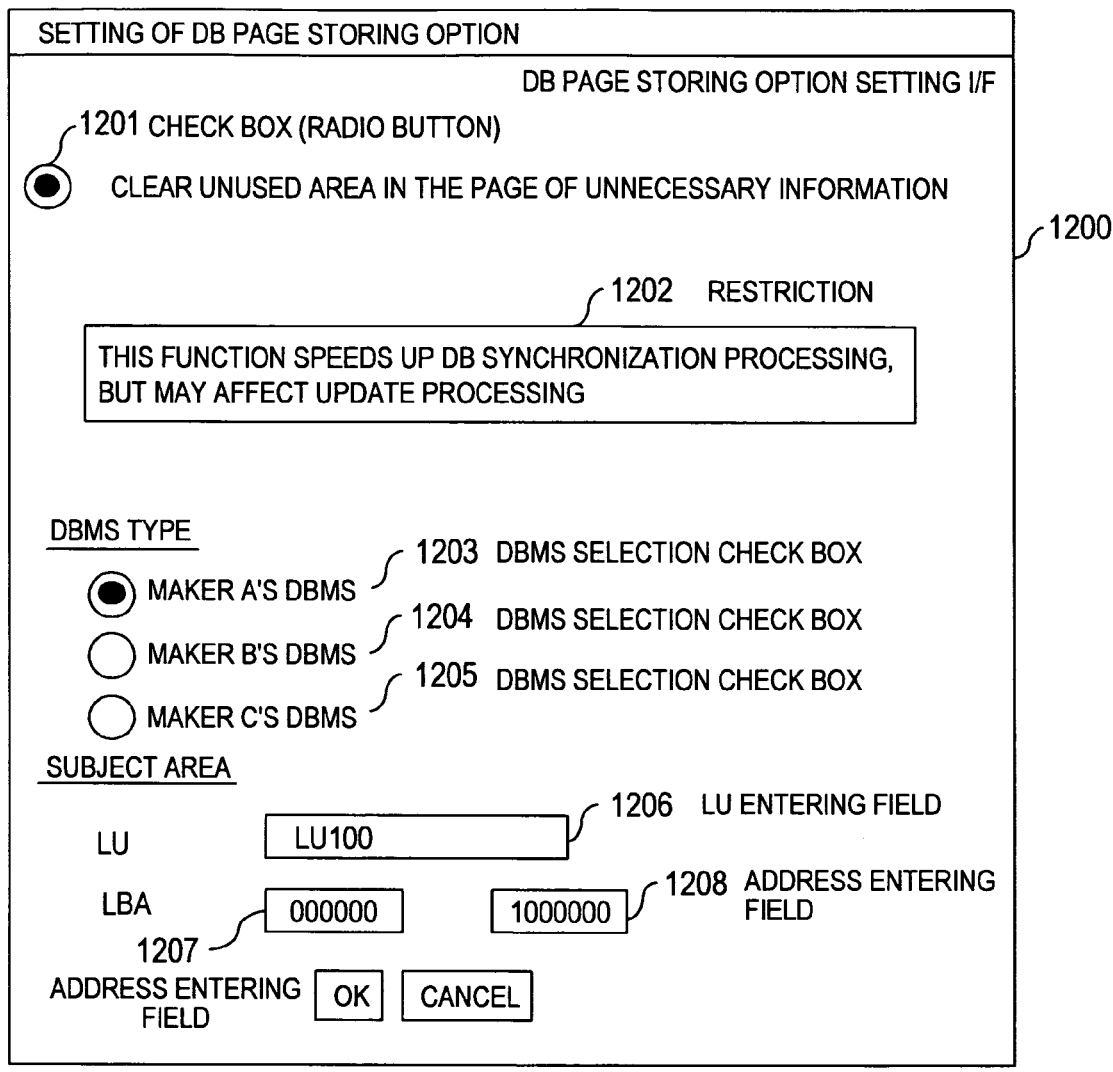
FIG. 16 is a screen image showing an example of a user interface which is provided to a management terminal according to the fourth embodiment.

In the fourth embodiment described above, whether the unnecessary information removing unit 1400 is enable or not can be set by the management terminal 340 or the like via the primary DBMS 101. In this case, the primary DBMS 101 sends a command received from the management terminal 340 or the like to the command processing unit 112 of the primary storage system 110, and has the command processing unit 112 set the unnecessary information removing unit 1400 to be enable or disable in accordance with the received command in the case where whether the unnecessary information removing unit 1400 is enable or not is set by the management terminal 340 or the like, the primary DBMS 101 may provide a setting screen (user interface) 1200 shown in FIG. 16 to the management terminal 340. FIG. 16 is an explanatory diagram showing an example of a display screen of the management terminal 340.

In FIG. 16, whether the unnecessary information removing unit 1400 is enabled or disabled is set with the use of a check box (radio button) 1201, for example. When an "OK" button in the drawing is clicked while the check box 1201 is selected with a click or the like, the primary DBMS 101 instructs the primary storage system 110 to enable the unnecessary information removing unit 1400. When the check box 1201 is unchecked, the primary DBMS 101 instructs the primary storage system 110 to disable the unnecessary information removing unit 1400.

The user interface of FIG. 16 may have a display portion 1202 for informing users of the possibility of affecting the processing performance of the primary storage system 110 by enabling the unnecessary information removing unit 1400. The user interface 1200 as this allows an administrator to enable unnecessary information removing processing in DB synchronization or the like.

The primary storage system 110 has to know the format of the DB page 200 in order for the unnecessary information removing unit 1400 of the primary storage system 110 to analyze the DB page 200. In the case where the disk subsystem 17 of the primary storage system 110 contains plural volumes and thus can store databases of different types, the setting screen 1200 may have check boxes 1203, 1204, and 1205 so that the type of DBMS can be selected. Which DBMS is to perform unnecessary information removing processing is specified on the setting screen 1200. The setting screen 1200 may also be used to specify which area in the disk subsystem 17 is to receive unnecessary information removing processing. For instance, the setting screen 1200 is designed such that a logical unit (LU) number and a logical address (LBA: Logical Block Address) in an LU are designated with the use of text entering fields 1206, 1207, and 1208 shown in FIG. 16. This way, what type of DBMS is to execute unnecessary information removing processing and the address of an area of the disk subsystem 17 that is to receive unnecessary information removing processing can be set in detail through the management terminal 340 or the like.

Figure 17:
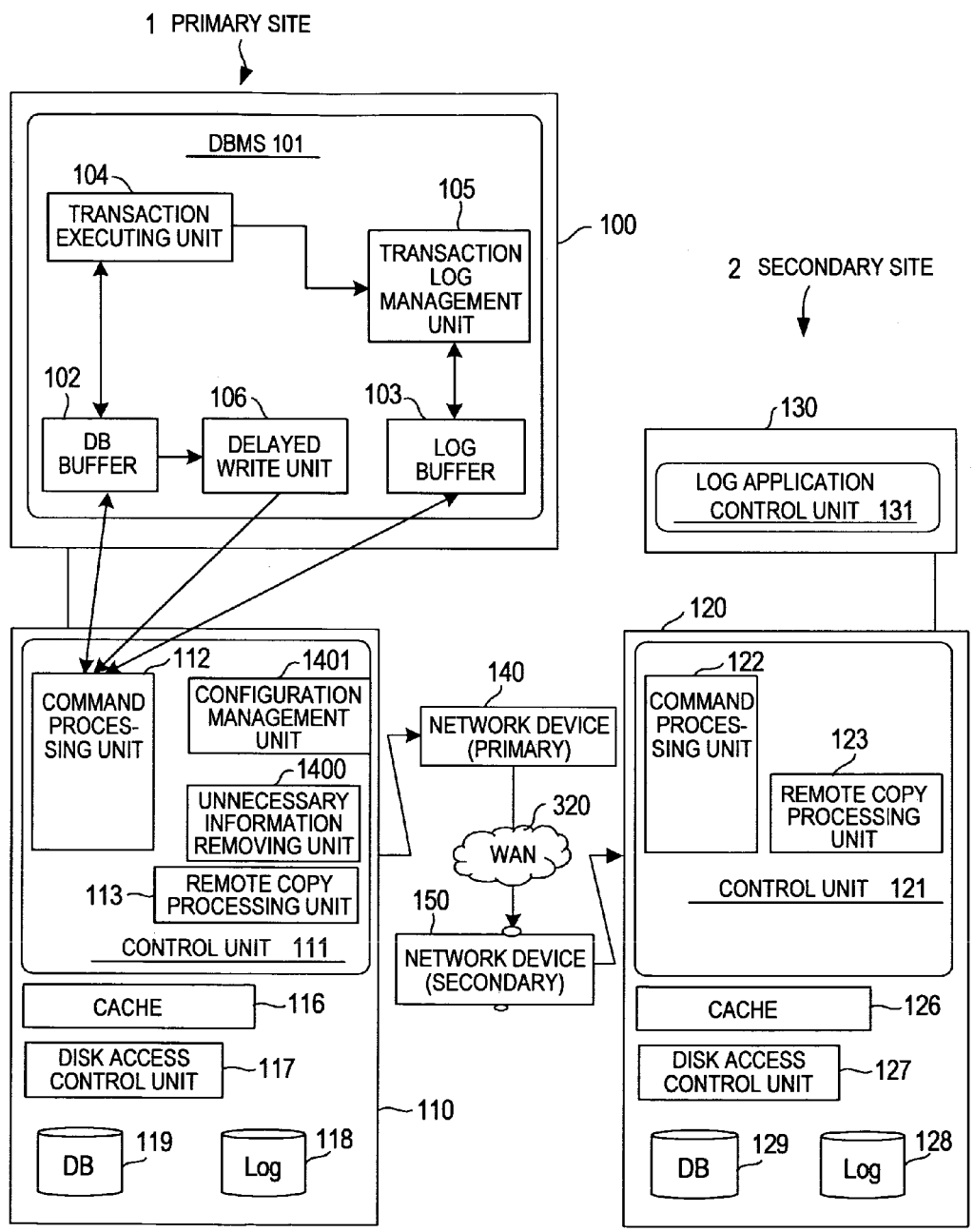
FIG. 17 is a block diagram showing the configuration of a disaster recovery system of the primary site and a secondary site according to the fourth embodiment.

FIG. 17 is a block diagram showing a DR system that is composed of the primary site 1 shown in FIG. 14 and the secondary site 2.

In FIG. 17, the unnecessary information removing unit 1400 is located in the primary storage system 110 and, as described above, clears the DB page 200 of an unused area in accordance with an update request sent from the primary DBMS 101.

The secondary site 2 of FIG. 17 is composed of the secondary storage system 120, which has a remote copy function, and the secondary server 130, which performs log application. The network devices 140 and 150 having a compressing/expanding function are connected to each other via the network 320, which is a WAN or other types of narrow-band network.

This DR system sends, in normal operation, only a log from the primary site 1 to the secondary site 2, where the received log 128 is applied to the secondary DB 129 to recover the secondary DB 129.

However, in the case where the primary DB 119 and the secondary DB 129 have to be synchronized with each other after an operation that does not involve log output from the primary site 1, the configuration management unit 1401 enables the unnecessary information removing unit 1400 and then the primary DB 119 is remote-copied to the secondary site 2 by the remote copy processing unit 113 of the primary storage system 110.

This remote copy can be completed within a realistic period of time despite being carried out over a narrow-band network, since an unused area (unnecessary information) in the primary DB 119 has been overwritten with 0 and thus the primary DB 119 can be compressed at a high compression ratio in the network device 140.

Figure 18:
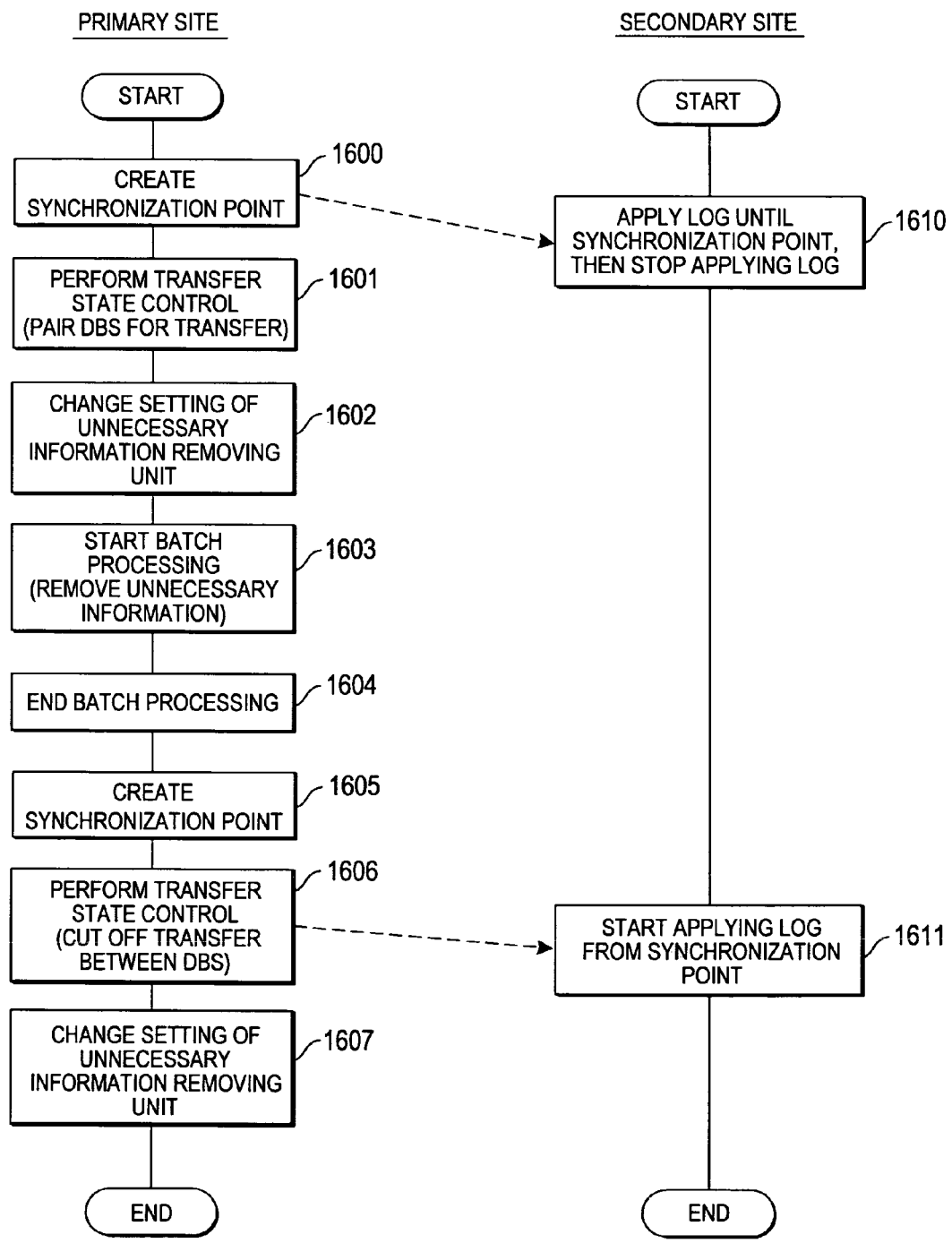
FIG. 18 is a time chart for synchronization between a primary DB and a secondary DB that is executed according to the fourth embodiment by the log-based DR system of FIG. 17 after log-less batch processing is executed in the primary DBMS.

FIG. 18 is a time chart for when the primary DB 119 and the secondary DB 129 are synchronized after log-less batch processing is executed in the primary DB 119 in the log-based DR system of FIG. 17.

Log-less batch processing is one of cases where the primary DB 119 and the secondary DB 129 have to be resynchronized. Log-less batch processing is a mode in which the primary DB 119 is updated while log output is temporarily stopped because the amount of update is too large to be executed in its entirety with sufficient online performance when log output is executed simultaneously.

Transferring the log 118 to the secondary site 2 is a prerequisite for the log-based DR system. Therefore, during a period in which transfer of the log 118 to the secondary site 2 is stopped, an update made to the primary DB 119 is copied to the secondary DB 129 of the secondary site 2 through remote copy. This processing will be described below with reference to FIG. 18.

First, the primary DBMS 101 creates a synchronization point (1600). The management terminal 340 or the like instructs the primary DBMS 101 to create a synchronization point. Examples of how to create a synchronization point include quiescencing (a dirty page is written in the primary storage 110 at a transaction is committed) and normal shutdown. The secondary site 2 applies a log until the created synchronization point is reached, and then log application in the secondary site 2 is stopped (1610).

Next, the settings of the remote copy processing unit 113 of the primary site 1 are changed such that the primary DB 119 carries out remote copy to the secondary DB 129 of the secondary site 2 (1601). Subsequently, the unnecessary information removing unit 1400 is enabled (1602).

Log-less batch processing is started while the unnecessary information removing unit 1400 is functional (1603). At this point, the DR system is set such that data of the primary DB 119 is transferred to the secondary DB 129 of the secondary site 2 through remote copy by the primary storage system 110, an update made through the log-less batch processing is reflected on the secondary DB 129 of the secondary site 2. After the completion of the log-less batch processing is confirmed (1604), a synchronization point is newly created (1605).

Next, the settings of the remote copy processing unit 113 of the primary site 1 are changed such that remote copy to the secondary site 2 by the primary DBMS 101 is shut off. The management terminal 340 or the like instructs the log application control unit 131 of the secondary site 2 to start log application from the second synchronization point (1611). Lastly, the unnecessary information removing unit 1400 in the primary storage system 110 of the primary site 1 is disabled and the reception of online processing requests is resumed to return to the normal copy processing of the log-based DR system (1607).

As described above, the synchronization between the primary DB 119 and the secondary DB 129 can be completed in a short period of time by transferring the primary DB 119 to the secondary DB 129 of the secondary site 2 through the remote copy function of the primary storage system 110 during log-less batch processing with the unnecessary information removing unit 1400 kept enabled. To elaborate, the DB page 200 updated through log-less batch processing is cleared with 0 of an unused area before stored in the primary storage system 110. The updated DB page 200 is transferred to the secondary DB 129 of the secondary site 2 through remote copy. The unused area, which has been cleared from the DB page 200 by writing a succession of the same character, can be compressed at a high compression ratio by the network device 140. This greatly reduces the data amount of the primary DB 119 transferred over the network 320, and therefore it does not take long to finish the transition from the end of log-less batch processing to the resumption of the normal operation of the log-based DR system.

Placing the unnecessary information removing unit 1400 in the primary storage system 110 also makes it possible to speed up log-less batch processing since the primary server 100 that runs the primary DBMS 101 does not need to take into account the load of unnecessary information removing processing. In other words, in the fourth embodiment where the primary storage system 110 handles reading of the updated DB page 200, unnecessary information removing processing, and writing in the primary DB 119, the primary DBMS 101 only has to have functions of receiving a query and creating a log of an updated page, and a management function.

The log-less batch processing of FIG. 18 is executable in the first to third embodiments in a similar manner.

Fifth Embodiment

Figure 19:
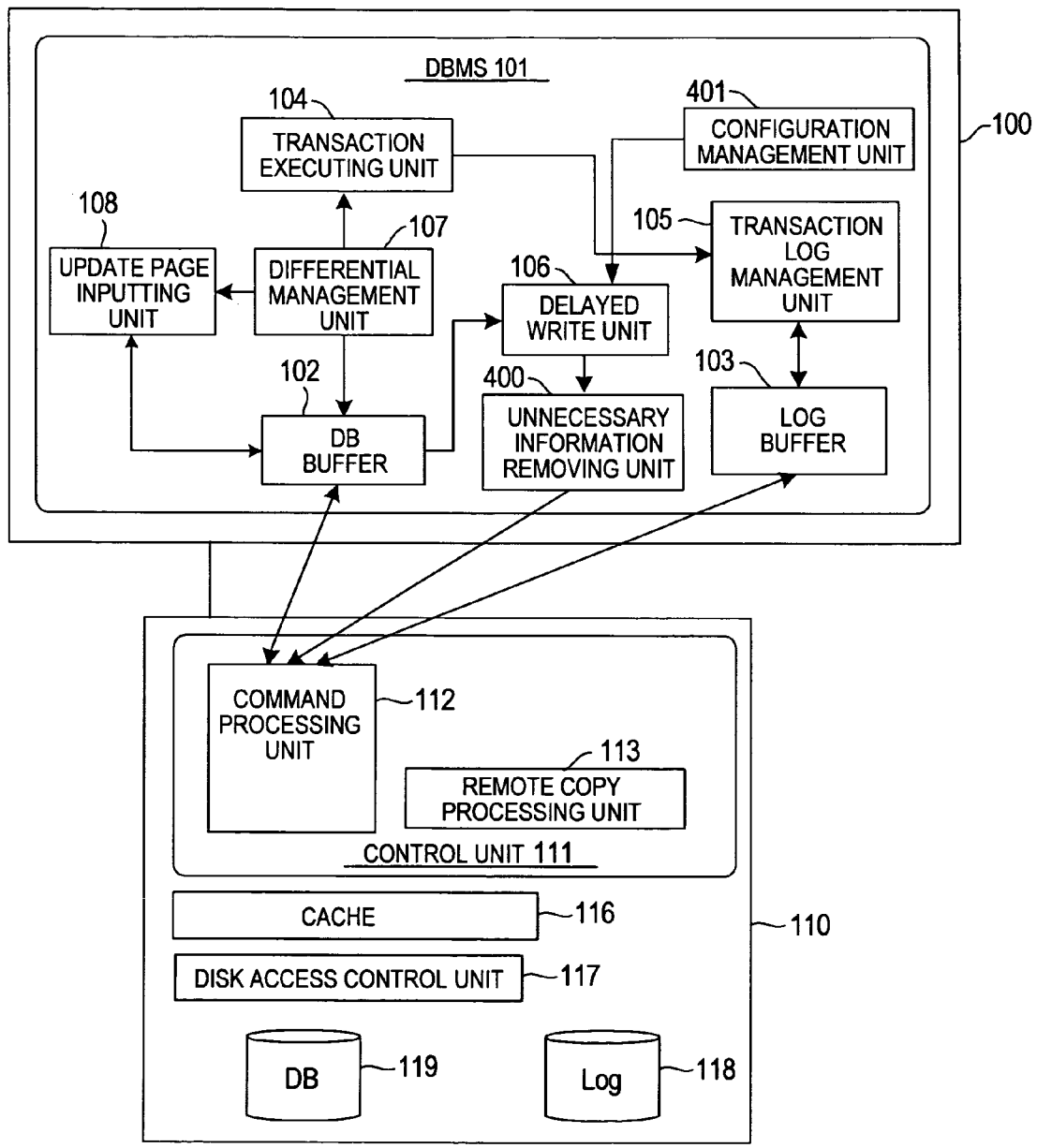
FIG. 19 is a block diagram showing the configurations of a primary DBMS and a primary storage system which are placed in a primary site according to a fifth embodiment of this invention.

FIG. 19 is a block diagram of a DR system according to a fifth embodiment. The DR system of the fifth embodiment is obtained by adding, to the primary DBMS 101 of the second embodiment, a differential management unit 107, which stores an updated area of the primary DB 119 in a differential bitmap, and an update page inputting unit 108, which reads the update DB page 200 out of the primary storage system 110 based on information of the differential management unit 107. The rest of the configuration of the fifth embodiment is the same as the second embodiment.

Described in the first to fourth embodiments is processing suitable for when update data is transferred to the secondary DB 129 of the secondary site 2 concurrently with log-less batch processing or other processing of updating the primary DB 119.

The fifth embodiment shows an example of a log-based DR system that accumulates updated areas of the primary DB 119 and transfers the accumulated differential transaction logs of the primary DB 119 at once at given timing to the secondary DB 129 of the secondary site 2. In other words, in the fifth embodiment, the unnecessary information removing unit 400 is kept disabled during normal operation and is enabled only when the updated DB pages 200 are transferred at once to the secondary site 2.

To give a few examples, differential transaction logs of the primary DB 119 are transferred at once to the secondary DB 129 of the secondary site 2 when a line failure of the network 320 has prevented log transfer for a long period of time, and when log application has been stopped for a long period of time due to maintenance (e.g., replacing the secondary server 130) of the secondary site 2. The primary DB 119 and the secondary DB 129 have to be synchronized in the case where the log 118 to be applied in the secondary site 2 has not been transferred, or in the case where the log 118 of the primary site 1 is overwritten with a new log 118 before the log 128 is applied in the secondary site 2. In such cases, the costly processing of transferring the entire primary DB 119 is avoided and updated areas of the primary DB 119 are accumulated in advance. After the line failure is solved or the maintenance work is finished, only the update data is compressed and transferred at once from the primary site 1 to the secondary site 2.

The differential management unit 107 of the primary DBMS 101 contains a differential bitmap of the primary DBMS 101 and others, and stores areas that have been updated within a given period of time. The differential management unit 107 stores update states in differential bitmaps associated with areas (e.g., the DB pages 200) of the primary DB 119 by setting relevant bits to the updated areas.

In transferring updates of the primary DB 119 at once, the update page inputting unit 108 reads the updated DB pages 200 out of the primary storage system 110 or the DB buffer 102 based on differential bitmaps that the differential management unit 107 has. The differential management unit 107 can be enabled or disabled as instructed by the management terminal 340 or the like. Alternatively, the differential management unit 107 may be enabled regularly.

The primary DBMS 101, in transferring updates of the primary DB 119 at once, inputs the updated DB pages 200, which are to be transferred, from the differential bitmaps of the differential management unit 107 to the update page inputting unit 108. When all the updated DB pages 200 have been inputted, the DB pages 200 in the update page inputting unit 108 are each cleared of an unused area, and then written in the primary storage system 110 by the delayed write unit 106. The primary storage system 110 transfers the DB pages 200 that have been cleared of an unused area at once through remote copy to the secondary storage system 120 of the secondary site 2, thereby synchronizing the secondary DB 129 with the primary DB 119.

Figure 20:
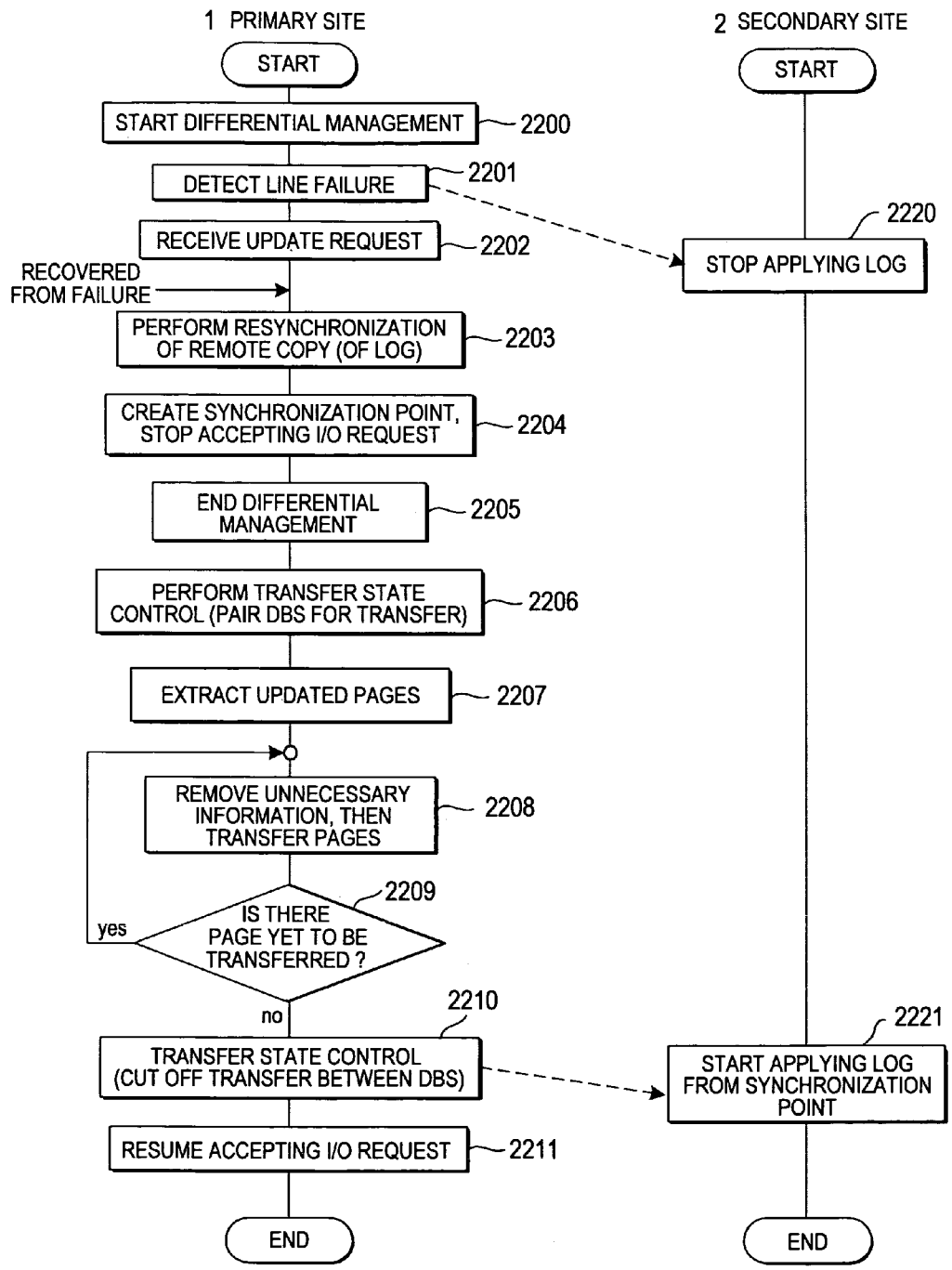
FIG. 20 is a time chart for synchronization between a primary DB and a secondary DB that is executed according to the fifth embodiment after the primary site recovers from a line failure that has happened during differential management in the primary site.

As an example of transferring updates at once, a procedure for recovery from a line failure is shown in FIG. 20.

In FIG. 20, the primary DBMS 101 first enables the differential management unit 107 to start differential management in advance (2200). The primary DBMS 101 then detects a line failure (2201). The primary DBMS 101 notifies the log application control unit 131 of the secondary site 2 of the detected line failure, and stops remote copy of the primary storage system 110.

Notified of the line failure from the primary site 1, the log application control unit 131 of the secondary site 2 stops applying logs (2200). The differential management of the primary site 1 may be executed regularly, or the start of the differential management may be aligned with a check point. Alternatively, the differential management may be started by enabling the differential management unit 107 when a line failure is detected. A line failure may be detected by sending heartbeat signals between the primary site 1 and the secondary site 2, or line failure detection may be coordinated with carries.

The primary DBMS 101 continues to accept requests to update or refer to the primary DB 119 while the line failure lasts (2202). The differential management unit 107 keeps recording in differential bitmaps what areas of the primary DB 119 have been updated.

After the primary site 1 recovers from a line failure, the primary storage system 110 of the primary site 1 resumes remote copy and re-establishes the connection for remote copy of the log 118 (2203). At this point, in the case where the line failure has lasted short, the log 118 that has been updated is transferred to the secondary site 2 through remote copy over the re-established connection and the secondary site 2 resumes log application. In the case where the line failure has caused the primary site 1 to stop remote copy of the log 118 for a long period of time, there is a possibility that a log in the secondary site 2 has been overwritten with a new log before receiving application of the log 128. When it is the case, the primary DB 119 has to be transferred to the secondary DB 129.

To transfer the primary DB 119 to the secondary DB 129 after remote copy of the log 118 has been stopped for a long period of time, the primary DBMS 101 of the primary site 1 creates a synchronization point and stops accepting IO requests (queries) (2204). The primary DBMS 101 next ends differential management (2205). Then the settings of the remote copy processing unit 113 of the primary storage system 110 are changed such that the DB page 200 written in the primary DB 119 is transferred to the secondary site 2 through remote copy (2206).

After the remote copy settings are changed, the primary DBMS 101 and the primary storage system 110 transfer the DB pages 200 that have been updated during the differential management period (differential transaction logs) at once as follows.

Based on the differential bitmap information of the differential management unit 107, the primary DBMS 101 inputs only the DB pages 200 that have been updated from the primary storage system 110 to the update page inputting unit 108 (2207). The primary DBMS 101 analyzes the DB pages 200 read into the update page input unit 108, namely, differential transaction logs, clears the DB pages 200 of unused areas (unnecessary information), and writes the cleared pages back to the primary storage system 110 (2208, 2209).

With the remote copy settings set as above to the primary DB 119 of the primary storage system 110, the DB pages 200 (updated pages) that are written back to the primary storage system 110 by the primary DBMS 101 are transferred to the secondary site 2.

The remote copy from the primary DB 119 to the secondary DB 129 of the secondary site 2 is cut off after all the DB pages 200 that have been recorded in differential bitmaps of the differential management unit 107 are transferred (2210).

As the remote copy is cut off, the log application control unit 131 of the secondary site 2 is activated to start log application from the synchronization point (2204) set by the primary DBMS 101. Lastly, the primary DBMS 101 resumes accepting IO requests (queries), the settings of the remote copy processing unit 113 of the primary storage system 110 are changed such that the log 118 of the primary DB 119 is remote-copied to the log 128 of the secondary site 2, and the log-based DR system thus returns to its normal way of replication.

In FIG. 20, reception of IO requests (queries) is ceased while the primary DB 119 is transferred to the secondary DB 129 of the secondary site 2. However, there is no need for the primary DBMS 101 to stop updating in the case where local mirroring is employed in the primary storage system 110 of the primary site 1 and, in transferring the primary DB 119, local mirroring is stopped so that the original and its mirror are separately used for update and for transfer.

As described above, the DB pages 200 that are updated are recorded in differential bitmaps by the differential management unit 107 in anticipation for temporary shutdown of the DR system due to a line failure, or in the case where log-less batch processing is employed and logs are not created. Updates in this case are made with the unnecessary information removing unit 400 disabled.

The unnecessary information removing unit 400 is enabled after the primary site 1 recovers from a line failure or after log-less batch processing is completed. Then the DB pages 200 that have been updated are read at once out of the differential bitmaps in the differential management unit 107, cleared of unused areas by the unnecessary information removing unit 400, and written in the primary DB 119. Before these pages are written in the primary DB 119, the settings of the remote copy processing unit 113 of the primary storage system 110 are changed such that the primary DB 119 is transferred to the secondary DB 129. This way, the DB pages 200 that have been updated during a line failure period or log-less batch processing period are cleared of unused areas and transferred at once to the secondary site 2. Since an unused area of the DB page 200 that is overwritten successively with the same character or value is compressed at a high compression ratio by the network device 140 as described in the above embodiments, an increase in communication time can be avoided despite the network 320 being a narrow-band network.

After the DB pages 200 that have been updated are transferred at once, the settings of the remote copy processing unit 113 of the primary storage system 110 are changed such that the log 118 is transferred to the secondary site 2, and the unnecessary information removing unit 400 is disabled. The DR system thus resumes its log-based operation.

This embodiment, in which, of data in the primary DB 119, only the DB pages 200 that have been updated during the above period are transferred from the primary site 1 to the secondary site 2, also cuts the transfer time much shorter than when the entire primary DB 119 is transferred to the secondary site 2.

Sixth Embodiment

Figure 21:
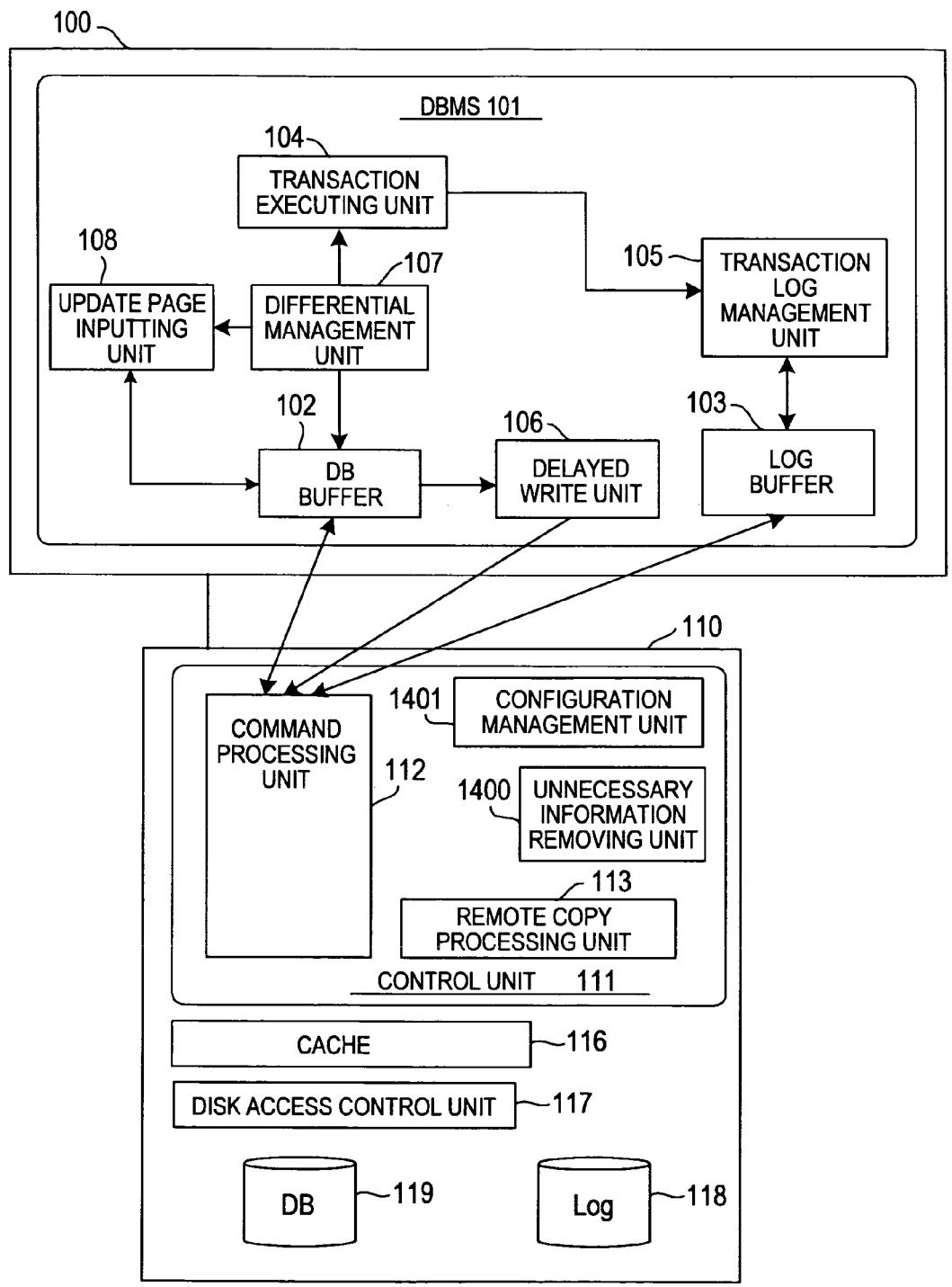
FIG. 21 is a block diagram showing the configurations of a primary DBMS and a primary storage system which are placed in a primary site according to a sixth embodiment of this invention.

FIG. 21 is a block diagram of a DR system according to a sixth embodiment. The DR system of the sixth embodiment is obtained by adding, to the primary DBMS 101 of the fourth embodiment, a differential management unit 107, which stores an updated area of the primary DB 119 in a differential bitmap, and an update page inputting unit 108, which reads the update DB page 200 out of the primary storage system 110 based on information of the differential management unit 107. The rest of the configuration of the sixth embodiment is the same as the fourth embodiment.

In the sixth embodiment, as same as in the fifth embodiment, the unnecessary information removing unit 400 is kept disabled during normal operation and is enabled only when the updated DB pages 200 are transferred at once to the secondary site 2.

The differential management unit 107 in the sixth embodiment stores the DB pages 200 that are updated during a line failure period or a log-less batch processing period as in the fifth embodiment.

After the primary site 1 recovers from the line failure or after the log-less batch processing is completed, the DB pages 200 that have been updated are read at once into the update page inputting unit 108 and written back to the primary storage system 110. For this, the unnecessary information removing unit 1400 is enabled and the remote copy processing 113 is set such that the written DB pages 200 are transferred to the secondary site 2.

In transferring at once the DB pages 200 that have been updated, the differential management by the differential management unit 107 is stopped as in the fifth embodiment. Based on the differential bitmaps of the differential management unit 107, the primary DBMS 101 reads only the DB pages 200 that have been updated while the differential management has been executed into the update page inputting unit 108. The primary DBMS 101 writes the DB pages 200 read into the update page inputting unit 108 back to the primary storage system 110.

The DB pages 200 written back to the primary storage system 110 by the primary DBMS 101 are cleared of unused areas by the unnecessary information removing unit 1400, and the cleared pages are written in the primary DB 119. The remote copy processing unit 113 transfers the DB pages 200 written back to the primary DB 119 to the secondary site 2.

The DB pages 200 transferred here are, as in the fifth embodiment, cleared of unused areas by overwriting the unused areas successively with the same character or value and therefore are compressed at a high compression ratio by the network device 140. Accordingly, in the sixth embodiment, an increase in communication time required for transfer of the DB pages 200 can be avoided despite the network 320 being a narrow-band network as in the fifth embodiment.

Seventh Embodiment

Figure 22:
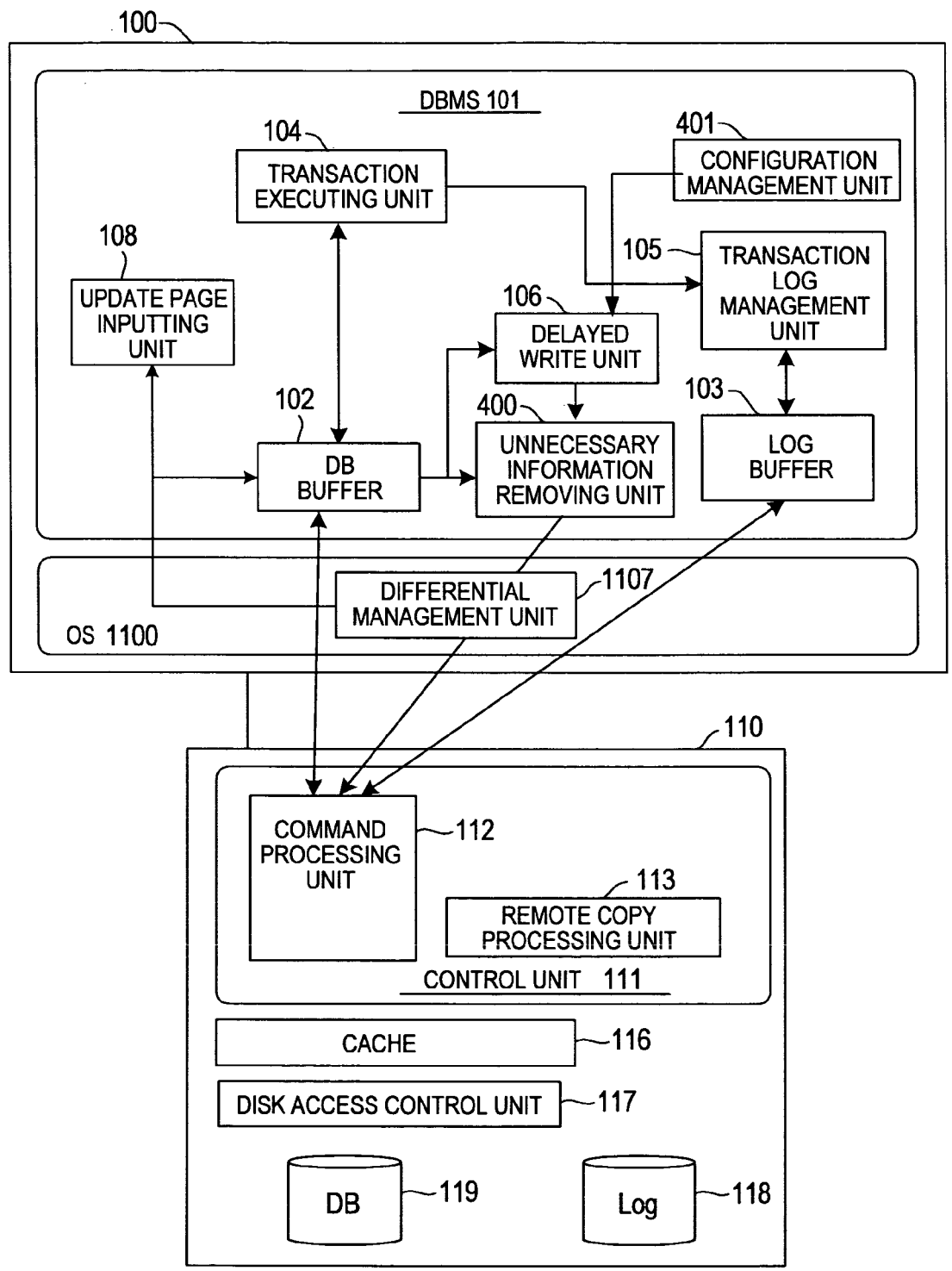
FIG. 22 is a block diagram showing the configurations of a primary DBMS and a primary storage system which are placed in a primary site according to a seventh embodiment of this invention.

FIG. 22 shows a seventh embodiment where the differential management unit 107, which is placed in the primary DBMS 101 in the fifth embodiment, is contained in an OS 1100 of the primary server 100. The rest of the configuration of the seventh embodiment is the same as the fifth embodiment.

The OS 1100, which manages the primary DBMS 101, is run in the primary server 100. In the OS 1100, a differential management unit 1107 functions to manage differential transaction logs of the primary DB 119 in the primary storage system 110.

The differential management unit 1107 in the OS 1100 stores, in differential bitmaps or the like, areas of the primary DB 119 that are updated during a certain period of time. When the primary DBMS 101 transfers updated pages at once, the update page inputting unit 108 inputs, from the primary storage system 110, based on the information in the differential management unit 1107, only the DB pages 200 that have been updated, and the delayed write unit 106 writes the pages of the update page inputting unit 108 back to the primary storage system 110. Prior to writing back these DB pages 200, the delayed write unit 106 calls up the unnecessary information removing unit 400 to overwrite unused areas (unnecessary information) in the DB pages 200 with a succession of the same given character or value such as "0".

In transferring the update pages at once, the remote copy processing unit 113 of the primary storage system 110 is set such that the DB pages 200 written in the primary DB 119 are transferred to the secondary site 2.

As in the fifth embodiment, the DB pages 200 are cleared of unused areas by overwriting the unused areas successively with the same character or value and therefore are compressed at a high compression ratio by the network device 140. Accordingly, in the seventh embodiment, an increase in communication time required for transfer of the DB pages 200 can be avoided despite the network 320 being a narrow-band network as in the fifth embodiment.

The differential management unit 1107, which, in FIG. 22, is contained in the OS 1100, may be contained in an LVM layer for managing a logical volume (LVM).

Eighth Embodiment

Figure 23:
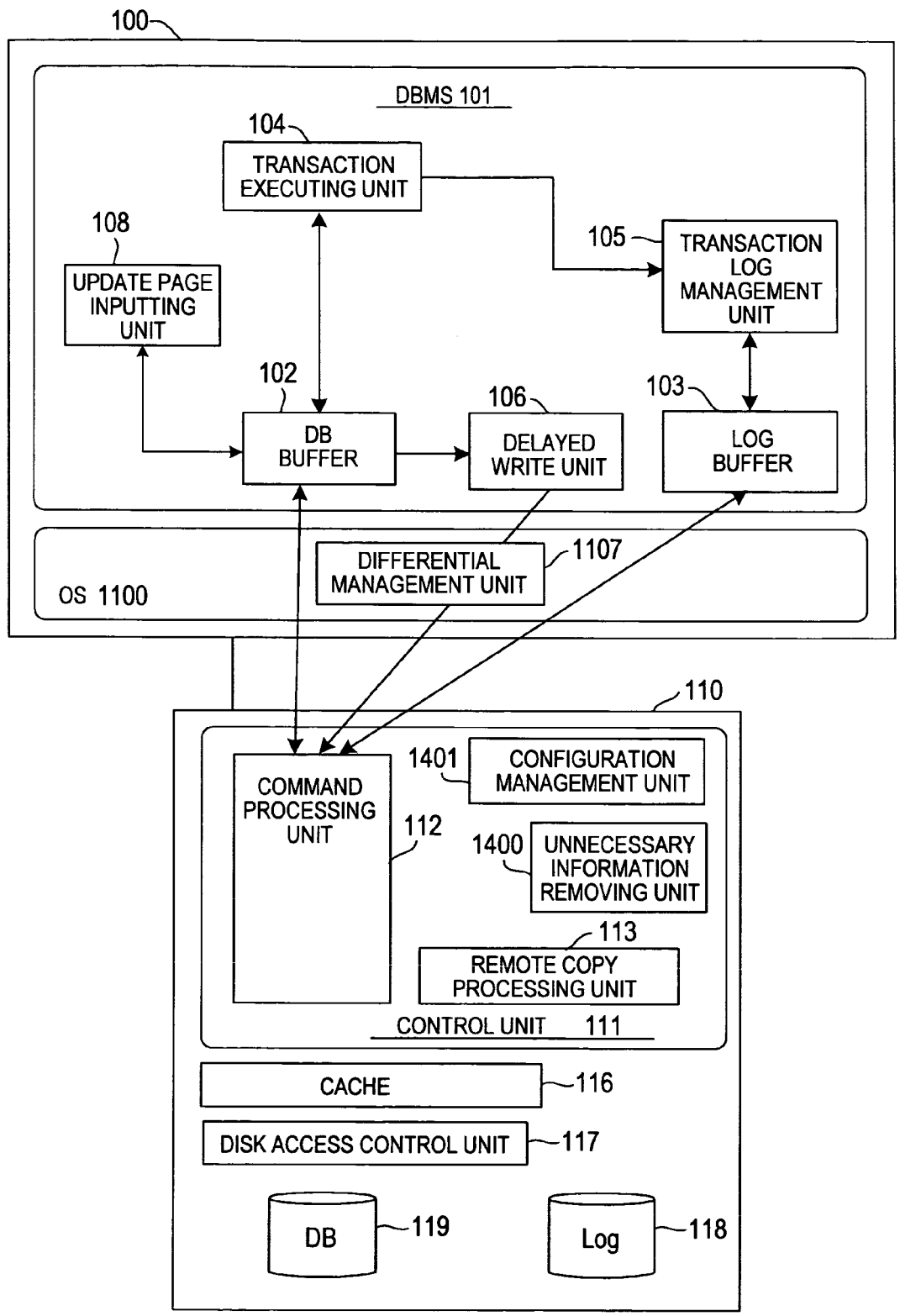
FIG. 23 is a block diagram showing the configurations of a primary DBMS and a primary storage system which are placed in a primary site according to an eighth embodiment of this invention.

FIG. 23 shows an eighth embodiment. In the eighth embodiment, the unnecessary information removing unit 400 and the configuration management unit 401, which, in the seventh embodiment, are in the primary DBMS 101, are executed by the control unit 111 of the primary storage system 110.

The unnecessary information removing unit 1400 and the configuration management unit 1401 in the primary storage system 110 are the same as those of the fourth embodiment. While the unnecessary information removing unit 1400 is enable, the DB pages 200 to be written in the primary DB 119 are cleared of unused areas.

The differential management unit 1107 in the OS 1100 stores, in differential bitmaps or the like, areas of the primary DB 119 that are updated during a certain period of time. When the primary DBMS 101 transfers updated pages at once, the update page inputting unit 108 inputs, from the primary storage system 110, based on the information in the differential management unit 1107, only the DB pages 200 that have been updated, and the delayed write unit 106 writes the pages of the update page inputting unit 108 back to the primary storage system 110.

Before these DB pages 200 are written back to the primary DB 119, the unnecessary information removing unit 1400 in the primary storage system 110 is enabled to overwrite unused areas (unnecessary information) in the DB pages 200 with a succession of the same given character or value such as "0".

In transferring the update pages at once, the remote copy processing unit 113 of the primary storage system 110 is set such that the DB pages 200 written in the primary DB 119 are transferred to the secondary site 2.

The DB pages 200 transferred here are, as in the fifth embodiment, cleared of unused areas by overwriting the unused areas successively with the same character or value and therefore are compressed at a high compression ratio by the network device 140. Accordingly, in the fifth embodiment, an increase in communication time required for transfer of the DB pages 200 can be avoided despite the network 320 being a narrow-band network as in the fifth embodiment.

Ninth Embodiment

Figure 24:
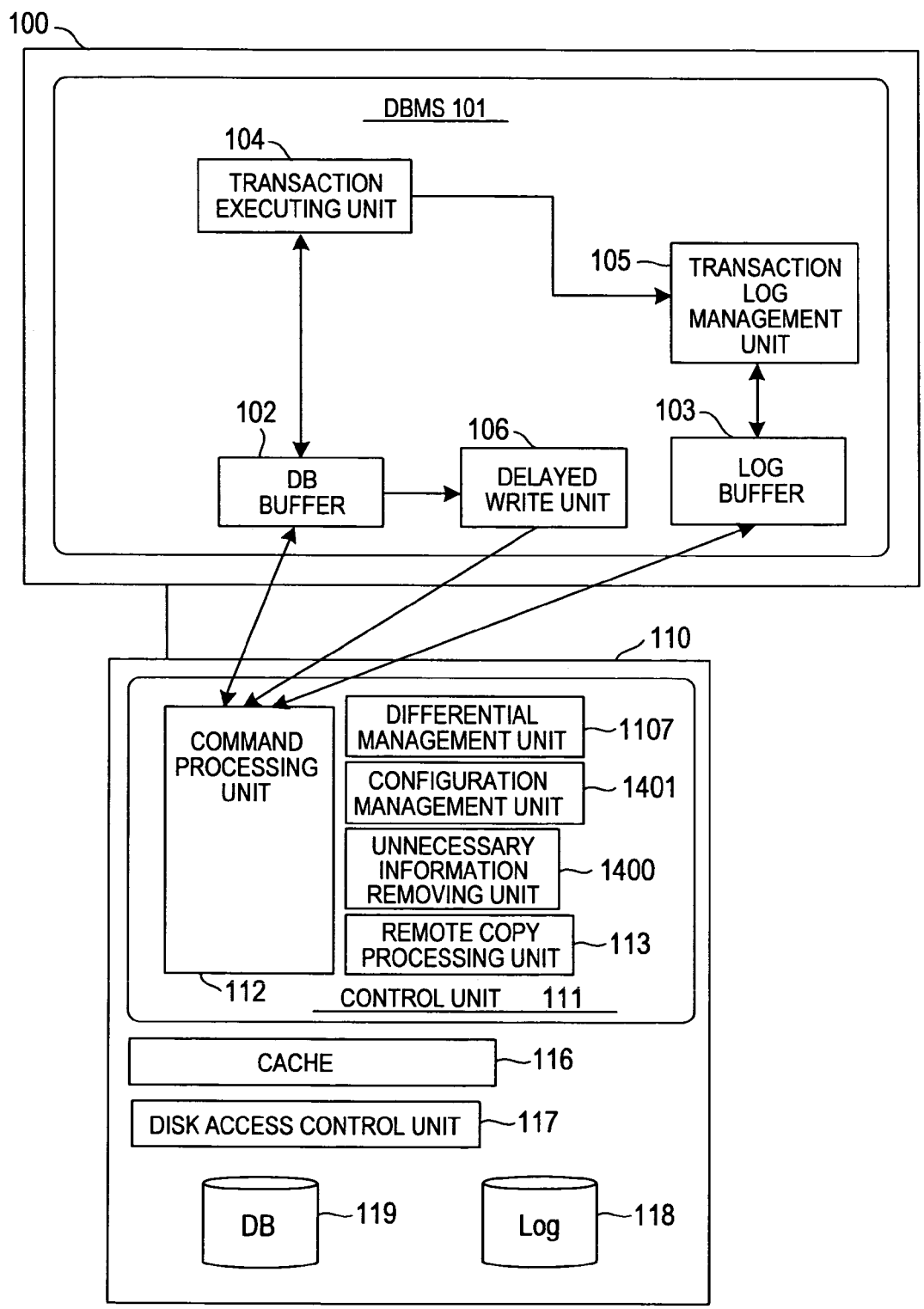
FIG. 24 is a block diagram showing the configurations of a primary DBMS and a primary storage system which are placed in a primary site according to a ninth embodiment of this invention.

FIG. 24 shows a ninth embodiment where the differential management unit 107, which is placed in the primary DBMS 101 in the sixth embodiment, is executed in the control unit 111 of the primary storage system 110. The rest of the configuration of the ninth embodiment is the same as the sixth embodiment.

In the ninth embodiment, the differential management unit 1107 is executed by the control unit 111 of the primary storage system 110 and stores, in differential bitmaps, areas of the primary DB 119 that are updated.

To transfer updated pages at once, the primary DBMS 101 first makes the differential management unit 1107 stop executing the differential management. The primary DBMS 101 then requests the primary storage system 110 to clear unused areas from the DB pages 200 that have been updated during the differential management period. Receiving the request, the primary storage system 110 enables the unnecessary information removing unit 1400, and changes the settings of the remote copy processing unit 113 such that data written in the primary DB 119 is transferred to the secondary site 2.

Based on the differential bitmaps in the differential management unit 1107, the primary storage system 110 reads only the DB pages 200 that have been updated out of the primary DB 119, and executes unnecessary information removing processing. The unnecessary information removing unit 1400 writes, back to the primary DB 119, the DB pages 200 that are now cleared of unused areas.

The remote copy processing unit 113 writes, back to the primary DB 119, the DB pages 200 written by the unnecessary information removing unit 1400, and at the same time transfers these DB pages 200 to the secondary site 2.

As in the fifth embodiment, the DB pages 200 are cleared of unused areas by overwriting the unused areas successively with the same character or value and therefore are compressed at a high compression ratio by the network device 140. Accordingly, in the ninth embodiment, an increase in communication time required for transfer of the DB pages 200 can be avoided despite the network 320 being a narrow-band network as in the fifth embodiment.

In the ninth embodiment where the primary storage system 110 handles reading of the updated DB page 200, unnecessary information removing processing, and writing in the primary DB 119, the primary DBMS 101 only has to have functions of receiving a query and creating a log of an updated page, and a management function.

As has been described, this invention is applicable to the log-based disaster recovery system that uses the narrow-band network to connect the primary site to the secondary site. This invention is particularly suitable for cases where the primary site and the secondary site are synchronized with each other after log-less batch processing is completed or after the primary site recovers from a line failure.

While the present invention has been described in detail and pictorially in the accompanying drawings, the present invention is not limited to such detail but covers various obvious modifications and equivalent arrangements, which fall within the purview of the appended claims.

What is claimed is:

1. A database management system, comprising:
   a first storage system that stores a database;
   a first server computer that executes a database management server, which receives one of a reference request and an update request related to the database of the first storage system, and performs one of referencing to the database and updating of the database;
   a second storage system coupled to the first storage system via a network, wherein the second storage system stores a copy of the database;

a second server coupled to the second storage system, wherein the second server is a standby for the first server; and a network apparatus coupled to the first server, wherein the first server includes:

a database buffer that holds database data in a plurality of pages configuring to the database, wherein each of said plurality of pages allocates a plurality of row data areas and links, wherein the links are associated with the row data areas, respectively, and wherein the links store offset values related to the row data areas, respectively;

a log buffer that holds update requests received in chronological order;

an update executing unit for reading page by page configuring into the database from the storage system onto the database buffer, and updates data as requested by the update request;

an unnecessary information removing unit, wherein when the update request is related to a first row data area and is associated with deleting row data in a second row data area or moving the row data to another row data area in the page, the unnecessary information removing unit overwrites the second row data area as an unused area in the page with a preset character and preset value;

a differential management unit that stores differential log as a result of executing the request to the log buffer;

a write unit that writes the database data in the DB buffer into the first storage system asynchronously with timing of execution of the update request and writes the differential log in the log buffer into the first storage system when an update that meets the condition is committed, wherein the first storage system has a disk access controller which receives the database data to store the database data into a first volume and receives the differential log into a second volume; and a remote copy unit for transferring the database to the second storage system via the network apparatus, and the differential log to the second storage system via the network apparatus, wherein the network apparatus includes a data compression unit compresses a continuous of the same value in the row data.

2. The database management system according to claim 1, wherein the database management server includes a configuration management unit for performing one of enabling and disabling of a function of the unnecessary information removing unit, and wherein the configuration management unit provides an interface for performing one of enabling and disabling of the function of the unnecessary information removing unit to a management computer which is connected via a network.

3. The database management system according to claim 1, wherein the update executing unit identifies which page is to be updated, reads the page out of the database, and updates the page.

4. The database management system according to claim 1, wherein the first server includes:

an update data input unit for reading, out of the storage system, at once, data of the areas is stored into the database buffer by the differential management unit, and wherein the unnecessary information removing unit overwrites an unused area in the data that is read into the update data input unit continuously with one of a preset character and a preset value.

5. The database management system according to claim 4, wherein the differential management unit has bitmaps corresponding to the updated database areas.

6. The database management system according to claim 1, wherein the server computer has an OS which executes the database management server wherein the OS has a differential management unit for storing areas of the updated data, and wherein the database management server has an update data input unit for reading, out of the storage system, at once, data of the areas stored by the differential management unit.

* * * * *